US012604083B2

(12) United States Patent
Huang et al.

(10) Patent No.: US 12,604,083 B2
(45) Date of Patent: Apr. 14, 2026

(54) RECOMMENDATION METHOD OF VIDEO RECORDING MODE, ELECTRONIC DEVICE, AND READABLE STORAGE MEDIUM

(71) Applicant: Honor Device Co., Ltd., Shenzhen (CN)

(72) Inventors: Yufei Huang, Shenzhen (CN); Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 98 days.

(21) Appl. No.: 18/729,331

(22) PCT Filed: Aug. 17, 2023

(86) PCT No.: PCT/CN2023/113621
§ 371 (c)(1),
(2) Date: Jul. 16, 2024

(87) PCT Pub. No.: WO2024/087823
PCT Pub. Date: May 2, 2024

(65) Prior Publication Data
US 2025/0097567 A1 Mar. 20, 2025

(30) Foreign Application Priority Data
Oct. 26, 2022 (CN) .......................... 202211328543.7

(51) Int. Cl.
*H04N 23/63* (2023.01)
*G06F 3/04817* (2022.01)
(Continued)

(52) U.S. Cl.
CPC ......... *H04N 23/632* (2023.01); *H04N 23/611* (2023.01); *H04N 23/62* (2023.01);
(Continued)

(58) Field of Classification Search
None
See application file for complete search history.

(56) References Cited

U.S. PATENT DOCUMENTS 9,191,571 B2 * 11/2015 Nakai .................. H04N 23/635
11,503,208 B2 * 11/2022 Song .................... H04N 23/632
(Continued)

FOREIGN PATENT DOCUMENTS

CN 103581558 A 2/2014
CN 111201772 A 5/2020
(Continued)

*Primary Examiner* — Ahmed A Berhan
(74) *Attorney, Agent, or Firm* — Conley Rose, P.C.

(57) ABSTRACT

A method includes, when an AI control is in an enabled state, an electronic device may determine whether a recommendation condition of a video recording mode is currently met based on a preview picture acquired by a camera in real time and/or another acquisition parameter. If a recommendation condition of a first video recording mode is met, the electronic device displays an icon corresponding to the first video recording mode on the preview interface, where the icon is for interaction with a user. When a condition for canceling recommendation of the first video recording mode is met, the electronic device cancels the display of the icon of the first video recording mode; and when a recommendation condition of a second video recording mode is met, the electronic device displays an icon of the second video recording mode on a preview interface.

20 Claims, 27 Drawing Sheets

(51) Int. Cl.
    *H04N 23/60*      (2023.01)
    *H04N 23/611*    (2023.01)
    *H04N 23/62*      (2023.01)
    *H04N 23/667*    (2023.01)
    *H04N 23/71*     (2023.01)

(52) U.S. Cl.
    CPC ........... *H04N 23/64* (2023.01); *H04N 23/667*
           (2023.01); *H04N 23/71* (2023.01)

(56) References Cited

U.S. PATENT DOCUMENTS

| | | |
|---|---|---|
| 11,800,221 B2 * | 10/2023 | Yang ..................... H04N 23/73 |
| 2014/0043517 A1 | 2/2014 | Yim et al. |
| 2021/0014420 A1 | 1/2021 | Song et al. |
| 2022/0159183 A1 | 5/2022 | Li et al. |

FOREIGN PATENT DOCUMENTS

| | | |
|---|---|---|
| CN | 113452910 A | 9/2021 |
| CN | 113965694 A | 1/2022 |
| CN | 115379113 A | 6/2024 |
| JP | 2013157678 A | 8/2013 |
| JP | 2020150433 A | 9/2020 |

* cited by examiner

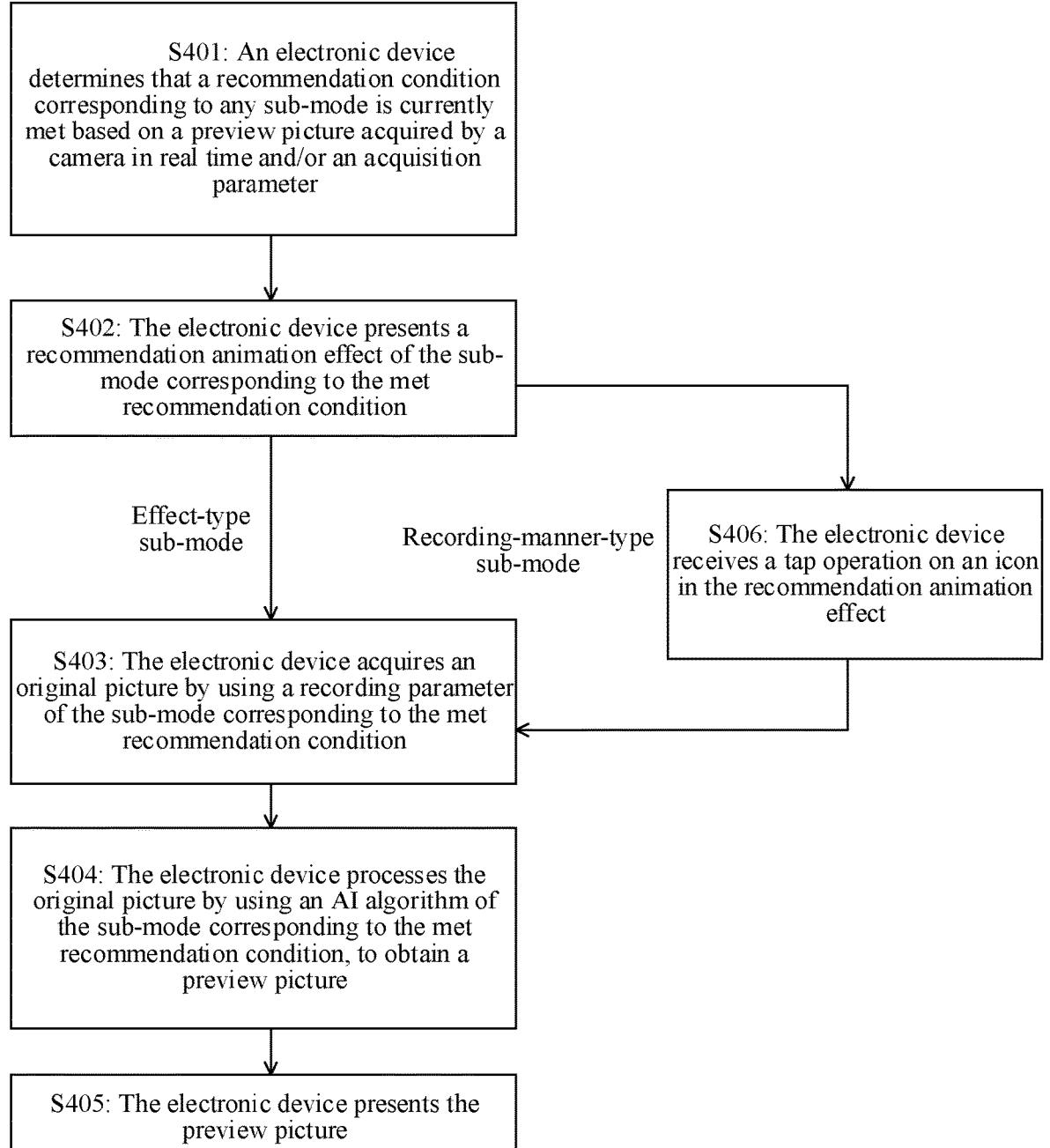

S401: An electronic device determines that a recommendation condition corresponding to any sub-mode is currently met based on a preview picture acquired by a camera in real time and/or an acquisition parameter S402: The electronic device presents a recommendation animation effect of the sub-mode corresponding to the met recommendation condition Effect-type sub-mode Recording-manner-type sub-mode S406: The electronic device receives a tap operation on an icon in the recommendation animation effect S403: The electronic device acquires an original picture by using a recording parameter of the sub-mode corresponding to the met recommendation condition S404: The electronic device processes the original picture by using an AI algorithm of the sub-mode corresponding to the met recommendation condition, to obtain a preview picture S405: The electronic device presents the preview picture

FIG. 4

Preview interface corresponding to
the video recording function

Preview interface corresponding to
the video recording function

Preview interface corresponding to
the video recording function

Preview interface corresponding to the
HDR mode

Record
control

HDR mode ✕

Preview interface corresponding to
the video recording function

Preview interface corresponding to
the video recording function

Preview interface corresponding to
the video recording function

Preview interface corresponding to
the video recording function

Preview interface corresponding to the video
recording function

Preview interface corresponding to the video
recording function

State when the
macro mode is
exited last time

Default
recommendation
state of the
macro mode

RECOMMENDATION METHOD OF VIDEO RECORDING MODE, ELECTRONIC DEVICE, AND READABLE STORAGE MEDIUM

CROSS-REFERENCE TO RELATED APPLICATIONS

This is a U.S. National Stage of International Application No. PCT/CN2023/113621 filed on Aug. 17, 2023, which claims priority to Chinese Patent Application No. 202211328543.7, filed with the China National Intellectual Property Administration on Oct. 26, 2022, both of which are incorporated herein by reference in their entireties.

TECHNICAL FIELD

This application relates to the field of camera application technologies, and in particular, to a recommendation method of a video recording mode, an electronic device, and a readable storage medium.

BACKGROUND

Currently, many electronic devices provided with cameras provide photographing and video recording functions. To meet diverse demands of users, the electronic devices provide a plurality of photographing modes such as beautify, night scene, and large aperture, and the users can autonomously select one of the photographing modes provided by the electronic devices.

However, the video recording modes provided by the electronic devices are undiversified, and generally, only a simple beautification function is provided, which requires the user to autonomously select the beautification function to obtain a beautification effect desired by the user, resulting in poor user experience.

SUMMARY

This application provides a recommendation method of a video recording mode, an electronic device, and a readable storage medium, which can recommend a video recording mode corresponding to a current scene to a user based on a video recording scene of the electronic device, thereby improving user experience.

To achieve the foregoing objective, the following technical solutions are used in this application:

According to a first aspect, this application provides a recommendation method of a video recording mode. The recommending method includes:

displaying, by an electronic device, a first preview interface of a video recording function, where the first preview interface includes an AI control and a preview picture captured by a camera, and the AI control is in an enabled state;

displaying, by the electronic device, an icon of a first video recording mode corresponding to a first scene on the first preview interface when it is detected at a first moment that a video recording scene of the electronic device is the first scene;

canceling, by the electronic device, the displaying of the icon of the first video recording mode on the first preview interface when it is detected at a second moment that the video recording scene of the electronic device is not the first scene, where the second moment is later than the first moment;

displaying, by the electronic device, an icon of a second video recording mode corresponding to a second scene on the first preview interface when it is detected at a third moment that the video recording scene of the electronic device is the second scene, where the third moment is later than the second moment;

receiving, by the electronic device, a first operation input by a user on the icon of the second video recording mode; and displaying, by the electronic device, a second preview interface of the second video recording mode in response to the first operation.

In this application, the electronic device may display, based on a currently detected video recording scene, an icon of a video recording mode corresponding to the current video recording scene on the first preview interface of the video recording function, to recommend the video recording mode corresponding to the current video recording scene, so that a problem that the user cannot select a suitable video recording mode when autonomously selecting a video recording mode is avoided; when it is detected that the video recording scene corresponding to the video recording mode being recommended is not currently met during the displaying of the icon of the video recording mode, the electronic device may also cancel the displaying of the icon of the video recording mode being displayed, thereby improving the intelligence in recommendation of the video recording mode, and improving user experience; the electronic device may also provide a plurality of video recording modes corresponding to a plurality of video recording scenes, to meet diverse scene video recording demands of the user; and the electronic device may display the second preview interface of the second video recording mode in response to the first operation input on the icon of the second video recording mode, in other words, the operation on the icon may trigger the electronic device to use the currently recommended video recording mode.

In an implementation of the first aspect of this application, the first video recording mode is a first-type sub-mode; and in the process of displaying, by the electronic device, a first video recording mode corresponding to a first scene on the first preview interface, the recommending method further includes:

receiving, by the electronic device, a second operation when the icon of the first video recording mode indicates an enabled state, where the second operation acts on the icon of the first video recording mode indicating the enabled state; and switching, by the electronic device in response to the second operation, the icon of the first video recording mode indicating the enabled state to an icon indicating a disabled state on the first preview interface; or receiving, by the electronic device, a third operation when the icon of the first video recording mode indicates a disabled state, where the third operation acts on the icon of the first video recording mode indicating the disabled state; and switching, by the electronic device in response to the third operation, the icon of the first video recording mode indicating the disabled state to an icon indicating an enabled state on the first preview interface.

In this application, the icon of the video recording mode may have the enabled state and the disabled state, and the user may trigger state switching of the icon through the operation on the icon; the icon in the disabled state indicates that the electronic device does not use the currently recommended video recording mode to obtain the preview picture, and the user may trigger the electronic device to obtain the preview picture in the currently recommended video recording mode by taping on the icon; and the icon in the enabled state indicates that the electronic device obtains the preview picture in the currently recommended video recording mode. In this manner, it can be convenient for the user to enable or disable the currently recommended video recording mode.

In another implementation of the first aspect of this application, when the electronic device displays an icon of the first-type sub-mode on the first preview interface, an initial state of the icon of the first-type sub-mode is the enabled state.

In this application, when the electronic device recommends icons of some video recording modes, the icons may be set to be in the enabled state by default, in other words, when the electronic device displays the icon of the video recording mode, the preview picture is obtained in the currently recommended video recording mode by default, thereby avoiding the need for the user to further tap on the icon to trigger the electronic device to obtain the preview picture or perform subsequent recording in the currently recommended video recording mode. Generally, a picture-quality-improvement-type mode may improve video recording quality, and an initial state of such a video recording mode may be set as the enabled state.

In another implementation of the first aspect of this application, the second video recording mode is a second-type sub-mode; and in the process of displaying, by the electronic device, an icon of a second video recording mode corresponding to a second scene on the first preview interface, the recommending method further includes:

receiving, by the electronic device, a third operation when the icon of the second video recording mode indicates a disabled state, where the third operation acts on the icon of the second video recording mode indicating the disabled state;

displaying, by the electronic device, the second preview interface of the second video recording mode in response to the third operation, where the second preview interface includes a first control indicating to disable the second video recording mode or cancel recommendation of the second video recording mode;

receiving, by the electronic device, a fourth operation when the electronic device displays the second preview interface of the second video recording mode, where the fourth operation acts on the first control; and displaying, by the electronic device, the first preview interface of the video recording function in response to the fourth operation.

In this application, there are also some video recording modes related to video recording capturing habits or special capturing demands. Because such video recording modes are generally related to special capturing requirements, such the video recording modes may be provided with an independent preview interface different from the first preview interface of the video recording function, to indicate that the electronic device generates the preview picture in such the video recording modes currently. In this way, the user can be reminded that a preview is currently being performed in such the modes.

In another implementation of the first aspect of this application, when the first control indicates to disable the second video recording mode, the icon of the second video recording mode on the first preview interface displayed by the electronic device in response to the fourth operation indicates the disabled state; and when the first control indicates to cancel the recommendation of the second video recording mode, the first preview interface displayed by the electronic device in response to the fourth operation does not include the icon of the second video recording mode.

In embodiments of this application, the first control may be set to disable a video recording mode based on specific application scenarios or characteristics of user groups. To be specific, after it is detected that the user taps on the first control, the electronic device can disable the video recording mode, but still displays an icon of the video recording mode, so that the user can perform video recording in the video recording mode again. Alternatively, the first control may be set to cancel recommendation of the video recording mode based on specific application scenarios or characteristics of user groups. To be specific, after it is detected that the user taps on the first control, the electronic device may cancel the recommendation of the video recording mode, and does not display the icon of the video recording mode. Personalized selection may be made during specific implementation.

In another implementation of the first aspect of this application, when the electronic device displays an icon of the second-type sub-mode on the first preview interface, an initial state of the icon of the second-type sub-mode is the disabled state.

In this application, generally, the second-type sub-mode related to video recording capturing habits or special capturing demands is used by the user when it is determined that there is a demand. Therefore, the initial state can be set to be in the disabled state, thereby improving user experience.

In another implementation of the first aspect of this application, the second video recording mode supports recording with a first focal length; and the displaying, by the electronic device, an icon of a second video recording mode corresponding to a second scene on the first preview interface when it is detected at a third moment that the video recording scene of the electronic device is the second scene includes:

displaying, by the electronic device, the icon of the second video recording mode corresponding to the second scene on the first preview interface when it is detected at the third moment that the video recording scene of the electronic device is the second scene and a focal length of the camera of the electronic device is the first focal length.

In this application, before the electronic device recommends a video recording mode, the focal length of the camera of the electronic device needs to be a focal length multiple supported by the video recording mode, to avoid a phenomenon that the video recording mode is recommended when the focal length before the video recording mode is recommended does not meet a focal length supported by the video recording mode, or the video recording mode cannot be used or a focal length selected by the user cannot be used.

In another implementation of the first aspect of this application, the second video recording mode does not support recording with a second focal length; and in the process of displaying, by the electronic device, an icon of a second video recording mode corresponding to a second scene on the first preview interface, the recommending method further includes:

receiving, by the electronic device, a fifth operation, where the fifth operation is for switching the focal length of the camera from the first focal length to the second focal length; and

canceling, by the electronic device in response to the fifth operation, the displaying of the icon of the second video recording mode on the first preview interface, and switching the focal length of the camera from the first focal length to the second focal length.

In this application, if the user selects a focal length multiple not supported in the currently recommended video recording mode through an operation on the preview interface, it indicates that the user has a strong willingness to select the focal length multiple not supported in the current mode to perform recording. In this case, to improve user experience, the electronic device may cancel the recommendation of the video recording mode, and generate the preview picture and perform recording with the focal length multiple selected by the user.

In another implementation of the first aspect of this application, the second video recording mode supports recording with a third focal length; and in the process of displaying, by the electronic device, an icon of a second video recording mode corresponding to a second scene on the first preview interface, the recommending method further includes:

receiving, by the electronic device, a sixth operation, where the sixth operation is for switching the focal length of the camera from the first focal length to the third focal length; and continuously displaying, by the electronic device in response to the sixth operation, the icon of the second video recording mode on the first preview interface, and switching the focal length of the camera from the first focal length to the third focal length.

In this application, when the user modifies a focal length multiple of the camera through an operation on the electronic device, it indicates that the user has a strong willingness to perform video recording with the modified focal length multiple. Therefore, a focal length on the interface can be set to be consistent with a focal length before an HDR mode is enabled, thereby improving user experience.

In another implementation of the first aspect of this application, after the switching, by the electronic device, the focal length of the camera from the first focal length to the third focal length on the first preview interface, the recommending method further includes:

receiving, by the electronic device, a seventh operation when the icon of the second video recording mode displayed on the first preview interface of the electronic device is in the enabled state, where the seventh operation acts on a second control on the first preview interface, and the second control is for starting video recording; and starting, by the electronic device in response to the seventh operation, video recording based on the third focal length and the second video recording mode.

In this application, after the electronic device enables the recommended video recording mode, the user may perform an operation acting on the second control for starting video recording, and when the electronic device receives the operation on the second control, the focal length multiple of the camera indicates a focal length multiple that the user intends to use. Therefore, in response to the operation, the electronic device performs video recording based on the enabled video recording mode and the currently modified focal length, thereby improving user experience.

In another implementation of the first aspect of this application, before the canceling, by the electronic device, the displaying of the icon of the first video recording mode on the first preview interface, the icon of the first video recording mode is in a first state, where the first state is not the initial state of the icon of the first video recording mode; and after the displaying, by the electronic device, an icon of a second video recording mode corresponding to a second scene on the first preview interface, the recommending method further includes:

canceling, by the electronic device, the displaying of the icon of the second video recording mode on the first preview interface when it is detected at a fourth moment that the video recording scene of the electronic device is not the second scene, where the fourth moment is later than the third moment;

displaying, by the electronic device, the icon of the first video recording mode corresponding to the first scene on the first preview interface when it is detected at a fifth moment that the video recording scene of the electronic device is the first scene and a time interval between the fifth moment and the second moment is shorter than first duration, where a current state of the icon of the first video recording mode is the first state, and the fifth moment is later than the fourth moment; and displaying, by the electronic device, the icon of the first video recording mode corresponding to the first scene on the first preview interface when it is detected at the fifth moment that the video recording scene of the electronic device is the first scene and the time interval between the fifth moment and the second moment is longer than or equal to the first duration, where the current state of the icon of the first video recording mode is the initial state of the icon of the first video recording mode.

In this application, it is assumed that when the electronic device cancels recommendation of a video recording mode last time, and an icon of the video recording mode is not in an initial state. In this case, when the video recording mode is recommended again, if a time interval between the recommendation twice is shorter, a state determined based on a use habit of the user last time may be used as an initial state when the same video recording mode is currently recommended. In the manner of learning the initial state during current recommendation based on the historical use habit of the user, the state during the current recommendation is more in line with the personal use habit of the user, thereby reducing switching again of the user, and improving experience of the user.

In another implementation of the first aspect of this application, the recommending method further includes:

receiving, by the electronic device, an eighth operation in the process of displaying, by the electronic device, an icon of a second video recording mode corresponding to a second scene on the first preview interface, where the eighth operation acts on the AI control in the enabled state; and canceling, by the electronic device in response to the eighth operation, the displaying of the icon of the second video recording mode corresponding to the second scene on the first preview interface.

In this application, a state of the AI control displayed on the first preview interface of the video recording function may be for controlling the electronic device to recommend a corresponding video recording mode based on a currently detected scene. To meet demands of different users, a recommendation function of the electronic device may also be disabled through the AI control, to avoid recommending displaying an icon on the first preview interface of the video recording function, so that personalized demands of the users can be met.

In another implementation of the first aspect of this application, before the displaying, by the electronic device, an icon of a first video recording mode corresponding to a first scene on the first preview interface, the recommending method further includes:

> displaying, by the electronic device, a recommendation symbol on the first preview interface, where the display process of the recommendation symbol is a gradual display process.

In this application, the recommendation symbol prompts the user that the AI function has been enabled currently and a corresponding scene is detected.

In another implementation of the first aspect of this application, the process of displaying, by the electronic device, an icon of a first video recording mode corresponding to a first scene on the first preview interface is a gradual display process; and > before the displaying, by the electronic device, an icon of a first video recording mode corresponding to a first scene on the first preview interface, or in the gradual display process of the icon, the recommending method further includes:
>
> canceling, by the electronic device, the displaying of the recommendation symbol on the first preview interface, where a disappearance process of the recommendation symbol is a gradual disappearance process.

In this application, interaction may be performed between the icon of the video recording mode and the user, to trigger the electronic device to enable or disable the currently recommended video recording mode.

In another implementation of the first aspect of this application, after the displaying, by the electronic device, an icon of a first video recording mode corresponding to a first scene on the first preview interface for second duration, the recommending method further includes:

> displaying, by the electronic device, first text information on the first preview interface, where the display process of the first text information includes a text gradual expansion process, and the first text information indicates a meaning of the icon of the first video recording mode; and
>
> canceling, by the electronic device, the displaying of the first text information after the first text information is displayed for third duration, where a disappearance process of the first text information includes a text gradual collapse process, a first bottom plate exists below the first text information, and the first bottom plate is expanded with the first text information and collapsed with the first text information.

In this application, the first text information prompts the user of a specific meaning of the icon. Because the first text information is generally displayed above the preview interface in a floating manner, it may occur that colors of the first text information and the preview picture below the first text information are similar. In this case, the user is less likely to see specific content of the first text information. Therefore, in embodiments of this application, a bottom plate may also be displayed below the first text information, and a color of the bottom plate is contrasted with the color of the first text information, so that the user is more likely to see the specific content of the first text information, to know a specific mode of the currently recommended icon.

In another implementation of the first aspect of this application, before the displaying, by the electronic device, an icon of a second video recording mode corresponding to a second scene on the first preview interface, the electronic device does not display the recommendation symbol.

In this application, after the electronic device enables the video recording function, the recommendation symbol may be displayed when the video recording mode is recommended for the first time, and the recommendation symbol may not be displayed when the video recording mode is not recommended for the first time, to avoid interference with the user caused by display of the recommendation symbol every time the video recording mode is recommended, and avoid delaying the displaying of the icon of the mode not recommended for the first time.

In another implementation of the first aspect of this application, after the displaying, by the electronic device, an icon of a second video recording mode corresponding to a second scene on the first preview interface, the recommending method further includes:

> canceling, by the electronic device, the displaying of the icon of the second video recording mode on the first preview interface when it is detected at a sixth moment that the video recording scene of the electronic device is not the second scene, where the sixth moment is later than the third moment; and
>
> displaying, by the electronic device, the icon of the first video recording mode corresponding to the first scene on the first preview interface when it is detected at a seventh moment that the video recording scene of the electronic device is the first scene, where the electronic device does not display the first text information of the first video recording mode when the icon of the first video recording mode is not displayed by the electronic device for the first time after the current video recording function is enabled, and the seventh moment is later than the sixth moment.

In this application, when a video recording mode is recommended for the first time after the electronic device enables the video recording function, text information and a bottom plate of the mode may be displayed. When the video recording mode is not recommended for the first time after the current video recording function is enabled, the user already knows a meaning of the video recording mode, so that there is no need to display the text information and the bottom plate again, to avoid interference with the user caused by the preview picture displayed at the bottom being blocked when the text information and the bottom plate are displayed again.

In another implementation of the first aspect of this application, the initial state of the icon of the first video recording mode is the disabled state; and if the electronic device recommends displaying the icon of the first video recording mode for the first time, after the displaying, by the electronic device, an icon of a first video recording mode corresponding to a first scene on the first preview interface for fourth duration, the recommending method further includes:

> displaying, by the electronic device, prompt information, where the prompt information prompts the user to tap on the icon of the first video recording mode to enable the first video recording mode.

In embodiments of this application, prompt information may also be displayed after the electronic device recommends a video recording mode for the first time for specific duration, to prompt the user to tap on a displayed icon to enable the video recording mode indicated by the icon, thereby reducing occurrence of a case in which the user is unclear how to use the video recording mode.

In another implementation of the first aspect of this application, the displaying, by the electronic device, an icon of a first video recording mode corresponding to a first scene on the first preview interface when a video recording scene of the electronic device is the first scene includes:

displaying, by the electronic device, the icon of the first video recording mode corresponding to the first scene on the first preview interface when the electronic device detects that a recommendation condition of the first video recording mode is currently met, where when the first scene is a macro scene, the recommendation condition of the first video recording mode is related to a distance of a to-be-captured object acquired by the electronic device and ambient light intensity;

when the first scene is an HDR scene, the recommendation condition of the first video recording mode is related to the ambient light intensity, and an overexposure ratio;

when the first scene is a night scene, the recommendation condition of the first video recording mode is related to the ambient light intensity;

when the first scene is a portrait scene, the recommendation condition of the first video recording mode is related to a proportion of a face in the preview picture acquired by the camera in the preview picture;

when the first scene is a multi-lens video recording scene, the recommendation condition of the first video recording mode is related to whether the preview picture acquired by the camera includes a preset target; and when the first scene is a protagonist scene, the recommendation condition of the first video recording mode is related to a quantity of faces in the preview picture acquired by the camera and a proportion of a largest face in the preview picture.

In this application, parameters in recommendation conditions corresponding to different scenes are set based on application environments of the different scenes. For example, the macro scene is applicable to close-up capturing, so that the distance between the to-be-captured object and the camera of the electronic device can be used as a parameter in a recommendation condition; the HDR scene is applicable to an overexposure condition, so that the anti-interference gain, the ambient light intensity, and the overexposure ratio can be used as parameters in a recommendation condition; the night scene is applicable to a dark capturing environment, so that the ambient light intensity can be used as a parameter in a recommendation condition; the portrait scene is applicable to face capturing, so that the proportion of the face in the preview picture acquired by the camera in the preview picture can be used as a parameter in a recommendation condition; the multi-lens scene is applicable to capturing a plurality of targets, so that whether preview picture acquired by the camera includes the preset target can be used as a parameter in a recommendation condition; and the protagonist scene is applicable to a multi-person capturing scene, so that the quantity of faces in the preview picture acquired by the camera and the proportion of the largest face in the preview picture can be used as parameters in a recommendation condition. Certainly, in actual applications, to distinguish the foregoing non-night scene modes from the night scene mode, the ambient light intensity may also be limited in the recommendation conditions of the non-night scene modes.

For a condition for canceling recommendation corresponding to a recommendation condition of a video recording mode, it may be considered that the condition for canceling recommendation is met when the recommendation condition for the video recording mode is not met; or a more relaxed condition than a parameter range of the recommendation condition may be set, so that after the video recording mode is recommended, even if the recommendation condition is not met for short time, the recommendation of the video recording mode is not canceled.

In another implementation of the first aspect of this application, the canceling, by the electronic device, the displaying of the icon of the first video recording mode on the first preview interface when the video recording scene of the electronic device is not the first scene includes:

canceling, by the electronic device, the displaying of the icon of the first video recording mode corresponding to the first scene on the first preview interface when the electronic device detects that a condition for canceling recommendation of the first video recording mode is currently met.

According to a second aspect, an electronic device is provided, including a processor, where the processor is configured to run a computer program stored in a memory, to implement the method according to any one of the implementations of the first aspect of this application.

According to a third aspect, a chip system is provided, including a processor, where the processor is coupled to a memory, and the processor is configured to run a computer program stored in the memory, to implement the method according to any one of the implementations of the first aspect of this application.

According to a fourth aspect, a computer-readable storage medium is provided, where the computer-readable storage medium stores a computer program, and the computer program, when executed by one or more processors, implements the method according to any one of the implementations of the first aspect of this application.

According to a fifth aspect, this application provides a computer program product, where the computer program product, when run on a device, enables the device to perform the method according to any one of the implementations of the first aspect of this application.

It may be understood that, for beneficial effects of the second aspect to the fifth aspect, refer to the relevant descriptions in the first aspect. Details are not described herein again.

BRIEF DESCRIPTION OF DRAWINGS

FIG. 4 is a schematic flowchart of a manner for recommending a video recording mode according to an embodiment of this application;

DESCRIPTION OF EMBODIMENTS

In the following description, for the purpose of illustration rather than limitation, specific details such as the specific system structure and technology are provided to thoroughly understand embodiments of this application. However, a person skilled in the art should know that this application may be implemented in other embodiments without these specific details.

It should be understood that when used in this specification and the appended claims of this application, the terms "include" indicate the presence of described features, wholes, steps, operations, elements and/or components, but do not exclude the presence or addition of one or more other features, wholes, steps, operations, elements, components and/or a set thereof.

It should be understood that, in embodiments of this application, "one or more" means one, two, or more than two. "And/or" is an association relationship for describing associated objects and indicates that three relationships may exist. For example, A and/or B may indicate: only A exists, both A and B exist, and only B exists, where A and B may be singular or plural. A character "/" generally indicates an "or" relationship between associated objects.

In addition, in this specification and the appended claims of this application, the terms such as "first", "second", "third", and "fourth" are used only to distinguish descriptions, and should not be understood as indicating or implying relative importance.

The reference to "one embodiment" or "some embodiments" described in this specification of this application means that a specific characteristic, structure or feature described in combination with this embodiment is included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have" and their variations mean "including but not limited to", unless otherwise specially emphasized in other ways.

A recommendation method of a video recording mode provided in embodiments of this application is applicable to an electronic device such as a large screen device provided with a camera, a tablet computer, a mobile phone, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
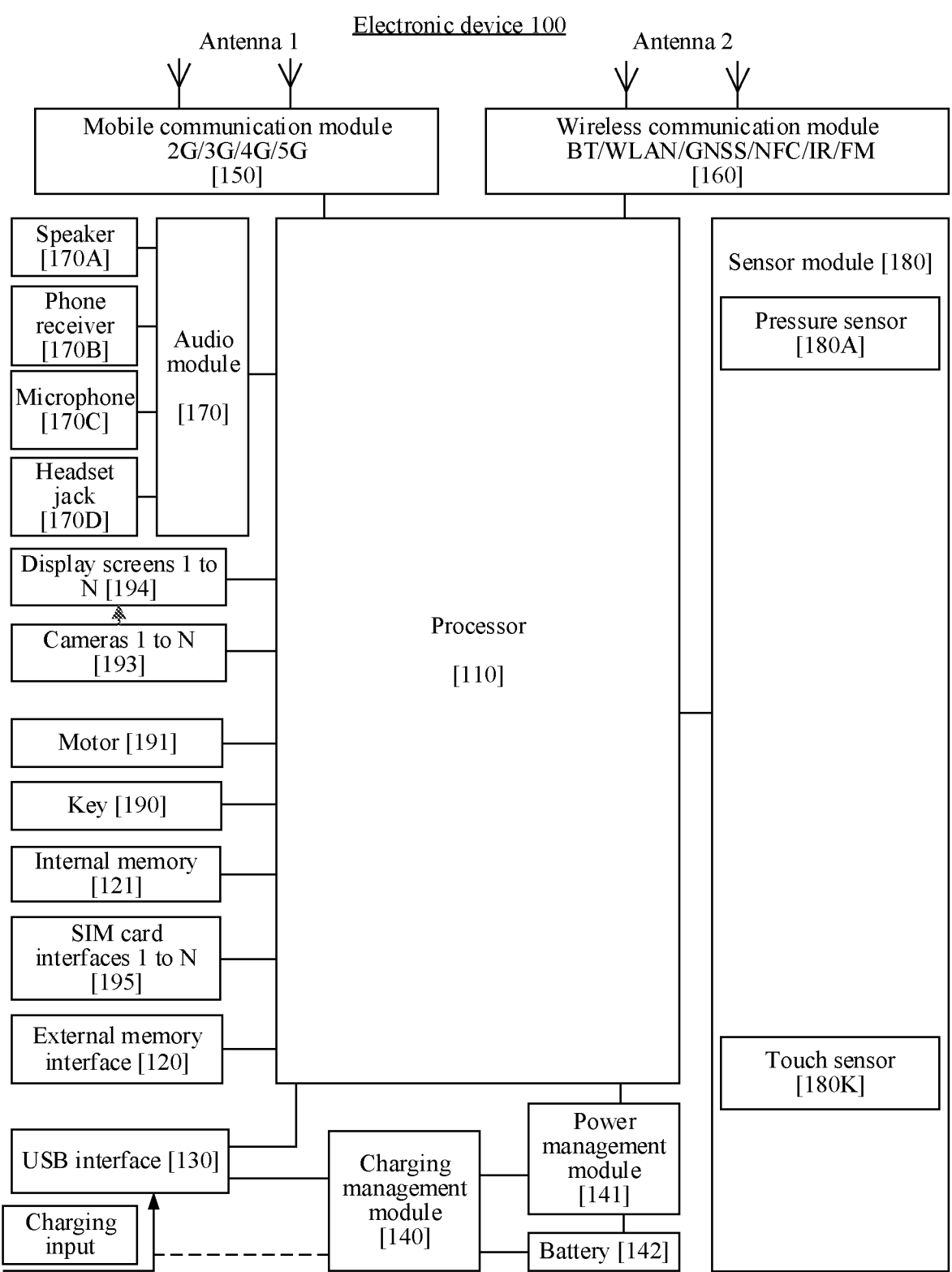
FIG. 1 is a schematic diagram of a hardware structure of an electronic device according to an embodiment of this application.

FIG. 1 is a schematic diagram of a structure of an electronic device. An electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, a camera 193, a display screen 194, a subscriber identity module (subscriber identity module, SIM) card interface 195, and the like. The sensor module 180 may include a pressure sensor 180A, a touch sensor 180K, and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time-sequence signal, to implement control of fetching instructions and executing the instructions.

The processor 110 may further be configured with a memory configured to store an instruction and data. In some embodiments, the memory in the processor 110 is a cache. The memory may store instructions or data recently used or cyclically used by the processor 110. If the processor 110 needs to use the instructions or the data again, the processor may directly invoke the instructions or the data from the memory, which avoids repeated access, and reduces waiting time of the processor 110, thereby improving system efficiency.

The USB interface 130 is an interface that conforms to a USB standard specification, and may be specifically a Mini USB interface, a Micro USB interface, a USB Type C interface, or the like. The USB interface 130 may be configured to connect to the charger to charge the electronic device 100, or may be used for data transmission between the electronic device 100 and a peripheral device, The external memory interface 120 may be configured to connect to an external storage card, for example, a micro SD card, to expand a storage capability of the electronic device 100. The external storage card communicates with the processor 110 through the external memory interface 120, to implement a data storage function, for example, storing a file such as a music or a video in the external storage card.

The internal memory 121 may be configured to store computer-executable program code, where the executable program code includes instructions. The processor 110 runs the instructions stored in the internal memory 121, to implement various functional applications and data processing of the electronic device 100. The internal memory 121 may include a program storage region and a data storage region. The program storage region may store an operating system, an application required by at least one function (such as a sound playing function and an image playing function), and the like.

In addition, the internal memory 121 may include a high-speed random access memory, and may further include a non-volatile memory, for example, at least one disk storage device, a flash memory device, or a universal flash storage (universal flash storage, UFS).

The charging management module 140 is configured to receive a charging input from a charger. The charger may be a wireless charger, or may be a wired charger. In some embodiments of wired charging, the charging management module 140 may receive a charging input of a wired charger through the USB interface 130.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like to be applied to the electronic device 100. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology.

The electronic device 100 may implement an audio function, for example, music playing and recording, by using the audio module 170, the speaker 170A, the phone receiver 170B, the microphone 170C, the headset jack 170D, the application processor, and the like.

The audio module 170 is configured to convert a digital audio signal into an analog audio signal output, and is also configured to convert an analog audio input into a digital audio signal. The audio module 170 may further be configured to encode and decode audio signals. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. Music may be listened to or a hands-free call may be answered by using the speaker 170A in the electronic device 100.

The phone receiver 170B, also referred to as a "receiver", is configured to convert an audio electrical signal into a sound signal. When the electronic device 100 is configured to answer a call or receive voice information, the phone receiver 170B may be put disable to a human ear to receive a voice.

The microphone 170C, also referred to as a "mic" and a "mike", is configured to convert a sound signal into an electrical signal. When making a call or sending voice information, a user may make a sound near the microphone 170C through the mouth of the user, to input a sound signal into the microphone 170C. At least one microphone 170C may be disposed in the electronic device 100. In some other embodiments, two microphones 170C may be disposed in the electronic device 100, to listen to the voice information and implement a noise reduction function. In some other embodiments, three, four, or more microphones 170C may be alternatively disposed in the electronic device 100, to acquire a sound signal, implement noise reduction, recognize a sound source, implement a directional recording function, and the like.

The headset jack 170D is configured to be connected to a wired headset. The headset jack 170D may be a USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may be a parallel plate including at least two conductive materials. When force is performed to the pressure sensor 180A, capacitance between electrodes changes. The electronic device 100 determines pressure strength based on a change in the capacitance. When a touch operation acts on the display screen 194, the electronic device 100 detects strength of the touch operation based on the pressure sensor 180A. The electronic device 100 may further calculate a position of the touch based on a detection signal of the pressure sensor 180A.

The touch sensor 180K is also referred to as a "touch panel". The touch sensor 180K may be disposed in the display screen 194, and the touch sensor 180K and the display screen 194 constitute a "touch screen". The touch sensor 180K is configured to detect a touch operation on or near the touch sensor 180K. The touch sensor may transfer the detected touch operation to the application processor to determine a type of the touch event. The touch sensor 180K may provide a visual output related to the touch operation by using the display screen 194. In some other embodiments, the touch sensor 180K may alternatively be disposed on a surface of the electronic device 100, and is located on a position different from that of the display screen 194.

The key 190 includes a power key, a volume key, and the like. The key 190 may be a mechanical key, or may be a touch-type key. The electronic device 100 may receive a key input, and generate a key signal input related to user setting and function control of the electronic device 100.

The motor 191 may generate a vibration prompt. The motor 191 may be configured to provide a vibration prompt for an incoming call, and may further be configured to provide a touch vibration feedback.

The electronic device 100 may implement a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute program instructions to generate or change display information.

The display screen 194 is configured to display an image, a video, or the like. In some embodiments, the electronic device 100 may include one or N display screens 194, and N is a positive integer greater than 1.

The camera 193 is configured to capture a still image or a video. In some embodiments, the electronic device 100 may include one or N cameras 193, and N is a positive integer greater than 1.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces, and N is a positive integer greater than 1.

Embodiments of this application do not specifically limit a specific structure of an execution entity of a recommendation method of a video recording mode, as long as code in which the recommendation method of a video recording mode provided in embodiments of this application is recorded can be run to perform processing based on the recommendation method of a video recording mode provided in embodiments of this application. For example, the execution entity of the recommendation method of a video recording mode provided in embodiments of this application may be a functional module in an electronic device that can invoke a program and execute the program, or a processing apparatus applied to the electronic device, such as a chip.

Currently, many electronic devices provided with cameras provide photographing functions and video recording functions. To meet diverse demands of users, the photographing functions of the electronic devices may provide a plurality of photographing modes such as beautify, large aperture, and night scene, and the users can autonomously select one of the photographing modes provided by the electronic devices, to improve current photographing effects.

Figure 2:
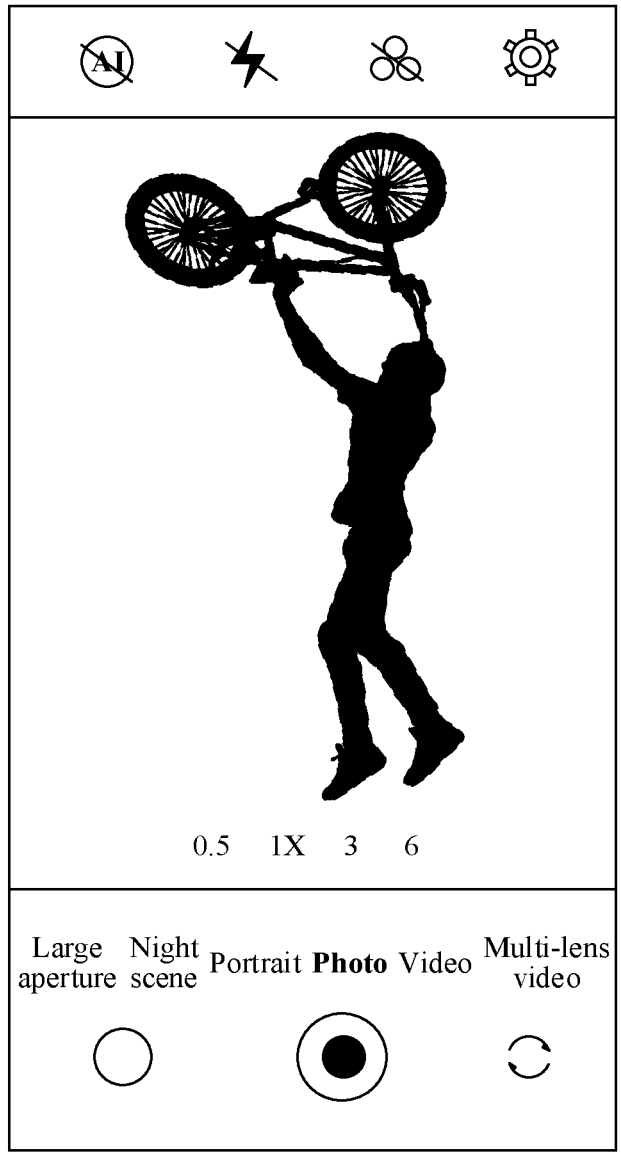
FIG. 2 is a schematic diagram of a main interface of a camera application of an electronic device according to an embodiment of this application.

FIG. 2 is a schematic diagram of a main interface of a camera application according to an embodiment of this application. In this embodiment of this application, the main interface of the camera application is a preview interface corresponding to a photographing function. To be specific, on the interface, a picture acquired by a camera in real time can be previewed, and a "photographing control" for start photographing is provided. A preview picture in the schematic diagram of the interface provided in this embodiment of this application is only used to indicate that the preview picture is displayed on a current interface, and there is no limitation on content of the preview picture.

A user taps on an icon of the camera application on a system desktop of an electronic device (or performs a preset shortcut gesture) to start the camera application. After the tap operation by the user on the icon of the camera application is received, the electronic device starts the camera application and displays the main interface (the preview interface corresponding to the photographing function) of the camera application.

A plurality of mode controls may be displayed on the preview interface corresponding to the photographing function, for example, a large aperture control, a night scene control, a portrait control, a photographing control, a video recording control, a multi-lens video recording control, and the like on the interface shown in FIG. 2. Large aperture, night scene, and portrait all belong to different sub-modes under the photographing function.

When the user photographs a portrait, the user may tap on the "portrait control". After the tap operation on the "portrait control" is received, the electronic device displays a preview interface of the portrait mode, and the electronic device generates a preview picture from an original picture acquired by the camera based on an algorithm provided for the portrait mode. Subsequently, after a tap operation on the "photographing control" is received, a corresponding portrait photo may be generated based on the preview picture.

When the user photographs at night, the user may tap on the "night scene control". After the tap operation on the "night scene control" is received, the electronic device displays a preview interface of the night scene mode, and the electronic device adjusts a parameter of the camera and/or generates a preview picture from an original picture acquired by the camera based on an algorithm provided for the night scene mode. Subsequently, after a tap operation on the "photographing control" is received, a corresponding night scene photo may be generated based on the preview picture.

For selection of the sub-modes under the photographing function, the user generally needs to autonomously determine a sub-mode to which a current photographing scene is applicable. Some sub-modes are easily determined, for example, the portrait mode may be selected when the user prepares to capture a face. However, some sub-modes are not easily determined, for example, the user may select the night scene mode during the night. Actually, the night scene mode may be applicable to a scenario with dark light, for example, in a dark room during the day, the night scene mode also needs to be used to achieve a good photographing effect, resulting in the user being unable to autonomously select a proper photographing mode. Specific meanings of some sub-modes may even require the user to have expertise to understand. For example, for the large aperture mode, a user unaware of the camera may not understand an applicable scenario of the large aperture, resulting in the user not understanding the use scenario of the mode at all, or even not selecting to use the mode at all.

In actual applications, the electronic device provides a simple video recording function, or provides only a simple beautification function, or provides a plurality of sub-modes. However, like the photographing function, the user also needs to autonomously select different sub-modes for video recording based on a desired effect, resulting in poor user experience.

In view of this, an embodiment of this application provides a recommendation method of a video recording mode, which can set a plurality of sub-modes for a video recording function in an electronic device. In a video recording mode, the electronic device predicts a current scene based on a preview picture acquired by a camera in real time and/or another acquisition parameter (for example, ambient light intensity); and presents (recommends), after it is predicted that the current scene belongs to a specific scene, the predicted scene (or a corresponding sub-mode) to a user. The electronic device may directly enter the sub-mode corresponding to the predicted scene (to be specific, process an original picture by using an algorithm of the sub-mode corresponding to the predicted scene to obtain a preview picture). Certainly, the user may alternatively select whether to process the original picture by using the algorithm of the sub-mode corresponding to the predicted scene to obtain the preview picture.

It should be noted that the recommendation method of different sub-modes in the video recording mode provided in this embodiment of this application is also applicable to recommendation of different sub-modes in a photographing mode. Subsequent embodiments of this application are described with the video recording function as an example. However, it may be understood by those skilled in the art that the video recording function in the subsequent embodiments of this application may also be the photographing function.

Figure 3:
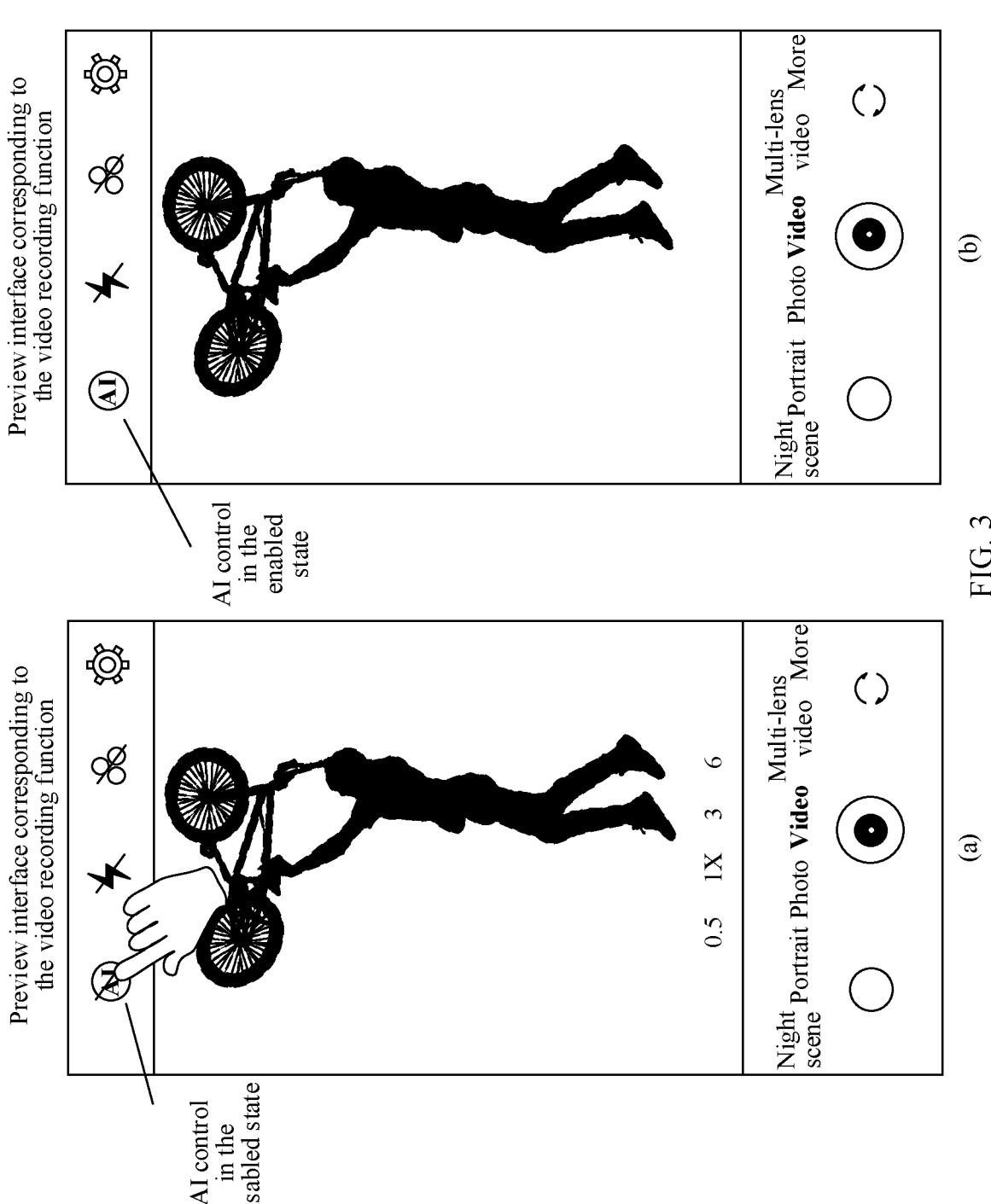
FIG. 3 is a schematic diagram of different states of an AI control on a preview interface of a video recording function of an electronic device according to an embodiment of this application.

(a) in FIG. 3 is a schematic diagram of a preview interface corresponding to a video recording function according to an embodiment of this application.

The user taps on the "video recording control" on the main interface (the preview interface corresponding to the photographing mode) of the camera application shown in FIG. 2. After the tap operation by the user on the "video recording control" is received, the electronic device displays the preview interface (where the interface may be denoted as a first preview interface) corresponding to the video recording function.

Refer to (a) in FIG. 3. A preview picture acquired by the camera and an AI control are displayed on the preview interface corresponding to the video recording function. The AI control is configured to enable an artificial intelligence (Artificial Intelligence, AI) function. The AI function in this embodiment of this application provides an AI algorithm for the electronic device to predict a current video recording scene (or video recording mode). To be specific, in the video recording mode of the camera application, after the AI function is enabled, the electronic device may predict the current scene (or mode) based on the preview picture acquired by the camera in real time and/or another acquisition parameter; and presents (recommends), after it is predicted that the current scene (or mode) belongs to a specific scene (or mode), the predicted scene (or mode) to the user.

Certainly, in actual applications, the AI function in the video recording mode may be enabled or disabled. In the video recording mode, if the AI function is disabled, the electronic device does not predict the current scene (or mode) and the like based on the preview picture acquired by the camera in real time and/or the another acquisition parameter.

In an example of enabling and disabling of the AI control, refer to (a) in FIG. 3. A slash is provided on the AI control on the preview interface corresponding to the video recording function, to indicate that the AI function is in a disabled state. Refer to (b) in FIG. 3. There is no slash on the AI control on the preview interface corresponding to the video recording function, to indicate that the AI function is in an enabled state.

Certainly, in actual applications, the enabled state and the disabled state of the AI function in the video recording mode may alternatively be indicated in icons of other forms. For example, when the AI control is in white (or black), it indicates that the AI function is disabled; and when the AI control is illuminated in another color (such as yellow or red) or is colored, the AI function is enabled. Display effects of the AI control in the enabled state and the disabled state are not limited in embodiments of this application.

By taping on the AI control, the user may trigger the electronic device to switch the enabled state and the disabled state of the AI function. When the AI function is in the enabled state, if the user taps on the AI control and the electronic device receives the tap operation on the AI control in the enabled state, the AI function is disabled; and when the AI function is in the disabled state, if the user taps on the AI control and the electronic device receives the tap operation on the AI control in the disabled state, the AI function is enabled.

In addition, the enabled state (or the disabled state) of the AI function may be used as a default state. After the electronic device enters the video recording mode, the AI function is in the default state. By taping on the AI control, the user triggers the electronic device to switch the AI function from the default state to another state. Certainly, the foregoing AI function may alternatively be set in a setting function of the camera application. In other words, no AI control appears on the interface shown in (a) or (b) in FIG. 3, and the user may further enable or disable the AI function in a setting control.

When the AI function shown in (b) in FIG. 3 is in the enabled state, the electronic device predicts the current scene (or mode) based on the preview picture acquired by the camera in real time and/or the another acquisition parameter.

In this embodiment of this application, a plurality of sub-modes may be set for the video recording function, for example, a macro mode, a portrait mode, an HDR mode, a night scene mode, a protagonist mode, and a multi-lens mode.

During specific implementation, for the video recording function of the electronic device, one or more of the foregoing listed sub-modes may be set, or other sub-modes than the foregoing listed sub-modes may be set. Certainly, names of the sub-modes may be different. This is not limited in embodiments of this application.

The AI function inside the electronic device also provides recommendation conditions and condition for canceling recommendations of different sub-modes. When the electronic device detects that a recommendation condition of any sub-mode is currently met, the electronic device may recommend (may or may not enter) the sub-mode; and when the electronic device detects that a condition for canceling recommendation of the sub-mode in the recommended state is currently met, the electronic device may cancel the recommendation of the sub-mode.

FIG. 4 is a schematic flowchart in which an electronic device recommends a video recording mode by using an AI algorithm when an AI function is enabled according to an embodiment of this application.

Step S401: The electronic device determines that a recommendation condition corresponding to any sub-mode is currently met based on a preview picture acquired by a camera in real time and/or an acquisition parameter.

In this embodiment of this application, an example in which a recommendation condition corresponding to a sub-mode A is used. For recommendation conditions and condition for canceling recommendations of different sub-modes, refer to detailed descriptions of subsequent embodiments.

Step S402: The electronic device presents a recommendation animation effect of the sub-mode corresponding to the met recommendation condition.

In this embodiment of this application, the electronic device presents a recommendation animation effect of the sub-mode A. The recommendation animation effect includes displaying an icon of the sub-mode A.

In this embodiment of this application, the icon of the sub-mode A may alternatively not be presented through the recommendation animation effect provided in this embodiment of this application, but the electronic device directly displays the icon of the sub-mode A on an interface when it is determined that a recommendation condition corresponding to the sub-mode A is currently met based on the preview picture acquired by the camera in real time and/or the acquisition parameter.

The icon of the sub-mode A may be displayed on a preview interface corresponding to a current video recording function.

When the sub-mode A is an effect-type sub-mode, the electronic device directly enters the sub-mode when presenting the recommendation animation effect of the sub-mode A, that is, performs step S403 to step S405.

When the sub-mode A is a recording-manner-type sub-mode, the electronic device enters the sub-mode after a tap operation on then icon is received. That is, the electronic device performs step S403 to step S405 after performing step S406.

In actual applications, some sub-modes may be set as modes that can be directly entered by the electronic device when determining that recommendation conditions of the sub-modes are met; and some sub-modes may be set as modes that cannot be directly entered by the electronic device when determining that recommendation conditions of the sub-modes are met, and that can be entered by the electronic device through triggers by a user.

In an example, some sub-modes (referred to as effect-type sub-modes) enhancing a video recording effect or having an optimization effect on image quality during video recording may be set as sub-modes that can be directly entered by the electronic device when recommendation conditions of the sub-modes are met, for example, a macro mode.

Some sub-modes (which may be referred to as recording-manner-type sub-modes) that are biased toward a personal video recording habit of the user or set for some special scenes may be set as sub-modes that cannot be directly entered by the electronic device when determining that recommendation conditions of the sub-modes are met, and that can be entered by the electronic device through triggers by the user, for example, an HDR mode, a portrait mode, a protagonist mode, a multi-lens mode, and a night scene mode.

Certainly, in actual applications, whether a sub-mode is a mode that can be directly entered by the electronic device (which may be referred to as a first-type sub-mode) or a mode that cannot be directly entered by the electronic device (which may be referred to as a second-type sub-mode) may be set according to actual cases. The foregoing examples are only for example, and there is no limitation on this application.

Step S406: The electronic device receives the tap operation on the icon.

As described above, in this embodiment of this application, the icon of the sub-mode A may be displayed through the recommendation animation effect, or the icon of the sub-mode A may be directly displayed. Certainly, in actual applications, the icon of the sub-mode A may alternatively be displayed in another manner. The icon of the sub-mode A is for implementing interaction with the user.

Step S403: The electronic device acquires an original picture by using a recording parameter of the sub-mode corresponding to the met recommendation condition.

Different recording parameters may be set for different sub-modes. For example, in the multi-lens mode, at least two cameras need to be enabled; and in the night scene mode, a flash may be turned on. In this embodiment of this application, the original picture may be acquired by using the recording parameter corresponding to the sub-mode A.

Step S404: The electronic device processes the original picture by using an AI algorithm of the sub-mode corresponding to the met recommendation condition, to obtain a preview picture.

Different AI algorithms may also be set for different sub-modes to process the original picture acquired by the camera. For example, in the portrait mode, the original picture is processed by using a beautification algorithm, to obtain a beautified preview picture.

Step S405: The electronic device displays the preview picture.

It may be understood based on step S403 and step S404 that different recording parameters and different AI algorithms are set for different sub-modes in the electronic device.

In actual applications, a same recording parameter and different AI algorithms, or different recording parameters and a same AI algorithm may alternatively be set for two or more sub-modes in the plurality of sub-modes set in the electronic device.

There may also be the following cases: Recording parameters of the sub-mode A and a sub-mode B are the same, and recording parameters of the sub-mode A and a sub-mode C are different; and AI algorithms of the sub-mode A and the sub-mode B are different, and AI algorithms of the sub-mode A and the sub-mode C are the same.

Certainly, in actual applications, regardless of whether recording parameters of sub-modes are the same and whether AI algorithms of the sub-modes are the same, the recording parameter used when the original picture is recorded in the sub-mode A may be understood as the recording parameter corresponding to the sub-mode A, and the AI algorithm used when the preview picture is generated based on the original picture acquired in the sub-mode A may be understood as the AI algorithm corresponding to the sub-mode A.

In another embodiment of this application, after step S405, the recommending method may further include:

If the electronic device determines that a condition for canceling recommendation corresponding to the recommended sub-mode is currently met based on the preview picture acquired by the camera in real time and/or the acquisition parameter, the electronic device cancels the recommendation of the sub-mode currently being recommended, and cancels the displaying of the icon of the currently recommended sub-mode on the preview interface.

It may be understood based on FIG. 4 that different sub-modes under the video recording function may be divided into two types: sub-modes that can be directly entered by the electronic device, and sub-modes that cannot be directly entered by the electronic device.

The following describes an interface change process in a recommendation process in which when the electronic device determines that a recommendation condition of a sub-mode is currently met, the electronic device cannot directly enter the sub-mode, and the electronic device can enter the sub-mode through a trigger by the user. For example, the sub-mode that cannot be directly entered by the electronic device is the HDR mode.

To facilitate understanding of subsequent embodiments, "recommendation", "enabled", "disabled", and "recommendation cancellation" of the HDR mode need to be explained.

In a capturing scene, when the electronic device recommends the HDR mode, the HDR mode may be in a disabled state by default. When the HDR mode is in the disabled state, the electronic device does not use a recording parameter corresponding to the HDR mode to acquire an original picture, and does not use an algorithm corresponding to the HDR mode to process the original picture, but obtains a preview picture by using a default recording parameter and algorithm of the video recording function of the electronic device.

When the electronic device recommends the HDR mode, the HDR mode may also be switched to an enabled state (in other words, the electronic device enters the HDR mode). When the HDR mode is in the enabled state, the electronic device acquires an original picture by using the recording parameter corresponding to the HDR mode, and processes the original picture by using the algorithm corresponding to the HDR mode, to obtain a preview picture. When the HDR mode is in the enabled state, if the user taps on a "record control", the electronic device acquires a video recorded in the HDR mode. When the HDR mode is in the enabled state, if the user triggers, through an operation on the preview interface, the electronic device to not use HDR mode to obtain the preview picture, the electronic device disables the HDR mode.

After the electronic device disables the HDR mode, the electronic device may still recommend the HDR mode, but the HDR mode is switched to the disabled state.

After the electronic device cancels the recommendation of the HDR mode, there is no enabled state and disabled state of the HDR mode.

After meanings of the foregoing different states are understood, the interface change process in the recommendation process of the HDR mode is described.

When the AI function is enabled, if the electronic device determines that a recommendation condition corresponding to the HDR mode is currently met based on the preview picture acquired by the camera in real time and/or the acquisition parameter, the electronic device presents a recommendation animation effect of the HDR mode. The recommendation animation effect is displayed above a preview interface of a video recording function in a floating manner.

For ease of understanding, the display process of the recommendation animation effect is described below with reference to schematic diagrams of a change of an interface shown in FIG. 5A to FIG. 5D and a time relationship of the change of the interface shown in FIG. 6.

Figure 5A:
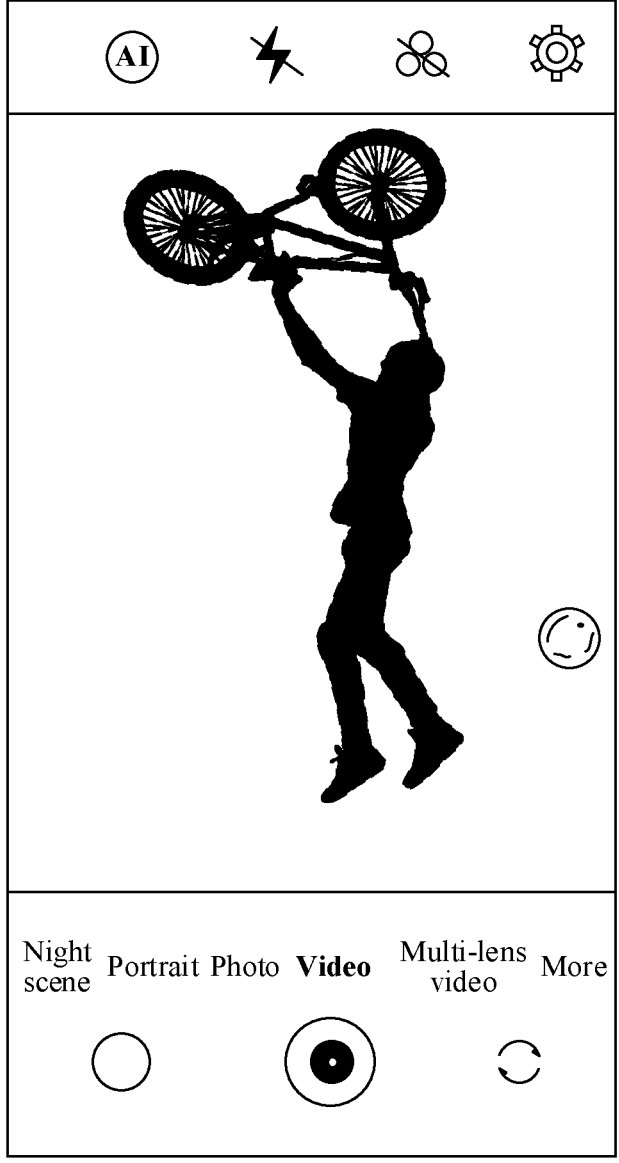
FIG. 5A to FIG. 5D are schematic diagrams of a change of an interface when an electronic device recommends a video recording mode that can be directly entered according to an embodiment of this application.

Refer to FIG. 5A. When it is detected that the recommendation condition corresponding to the foregoing HDR mode is met, the electronic device first displays a recommendation symbol on the preview interface of the video recording function, where the recommendation symbol may be an identification symbol of an arbitrary shape. The recommendation symbol may prompt the user that the enabled AI function is detecting or detects a corresponding scene. In an example, the recommendation symbol may be a bubble. The recommendation animation effect includes an appearance process of the recommendation symbol and a disappearance process of the recommendation symbol. The appearance process of the recommendation symbol may be a gradual display process: a gradual process from transparent to clear. The disappearance process of the recommendation symbol may be a gradual disappearance process: a gradual process from clear to transparent.

Figure 6:
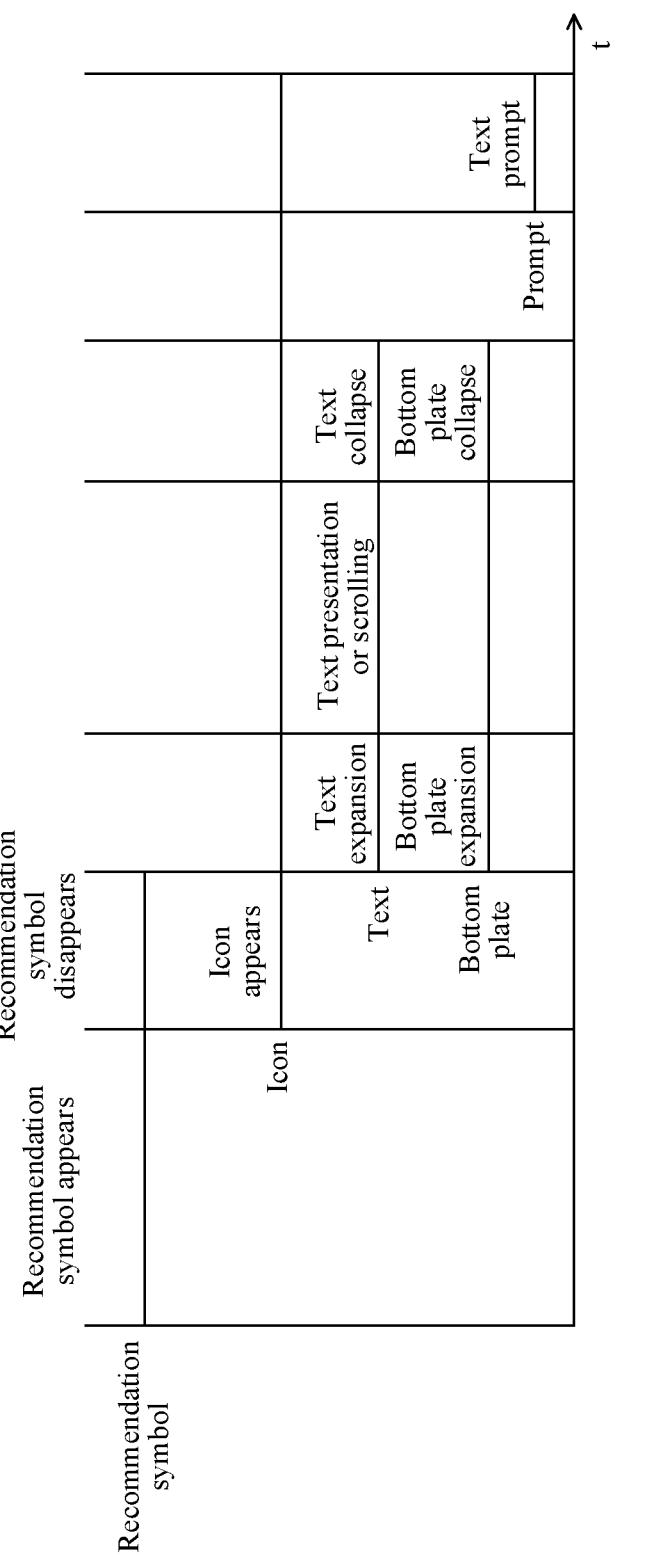
FIG. 6 is a schematic diagram of a time relationship when an electronic device recommends a video recording mode that can be directly entered according to an embodiment of this application.

Refer to FIG. 6. A presentation process of the recommendation symbol includes an appearance process of the recommendation symbol and a disappearance process of the recommendation symbol. In the disappearance process of the recommendation symbol, an icon of the HDR mode appears. The icon of the HDR mode is for interaction with the user, for example, the electronic device may be triggered to enable the HDR mode through an operation on the icon of the HDR mode. The appearance process of the HDR icon may also be a gradual display process: a gradual process from transparent to clear. Duration for which the icon changes from transparent to clear may be shorter than or equal to duration for which the recommendation symbol changes from clear to transparent. In other words, when the recommendation symbol fully disappears, the icon has become clear.

Figure 5B:
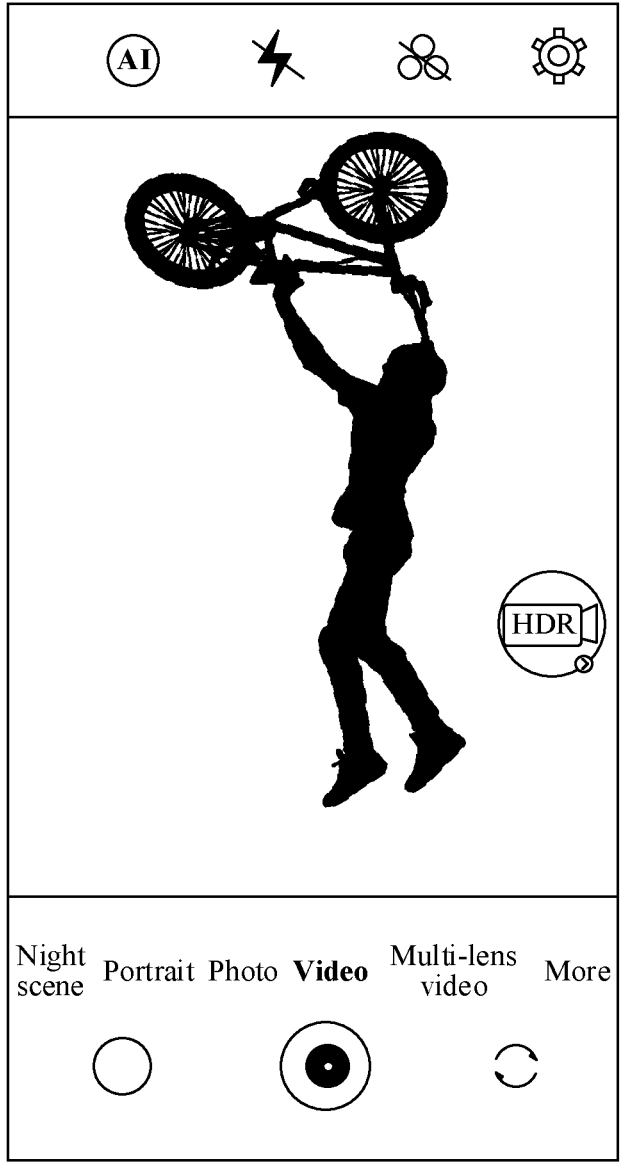

Refer to FIG. 5B. The icon of the HDR mode is displayed by the electronic device on the preview interface of the video recording function. After the icon of the HDR mode appears on the preview interface, the icon of the HDR mode may be displayed on the preview interface of the video recording function until the electronic device cancels the recommendation of the HDR mode.

Refer to FIG. 6. After the recommendation symbol disappears and the icon appears, text "HDR mode" corresponding to the HDR mode is immediately displayed or is recommended to be displayed for a period of time (for example, second duration). The text prompts the user of a specific meaning of the icon. The text corresponding to the HDR mode includes a text gradual expansion process, a text presentation (or scrolling) process (which may be displayed for third duration), and a text gradual collapse process.

Figure 5C:
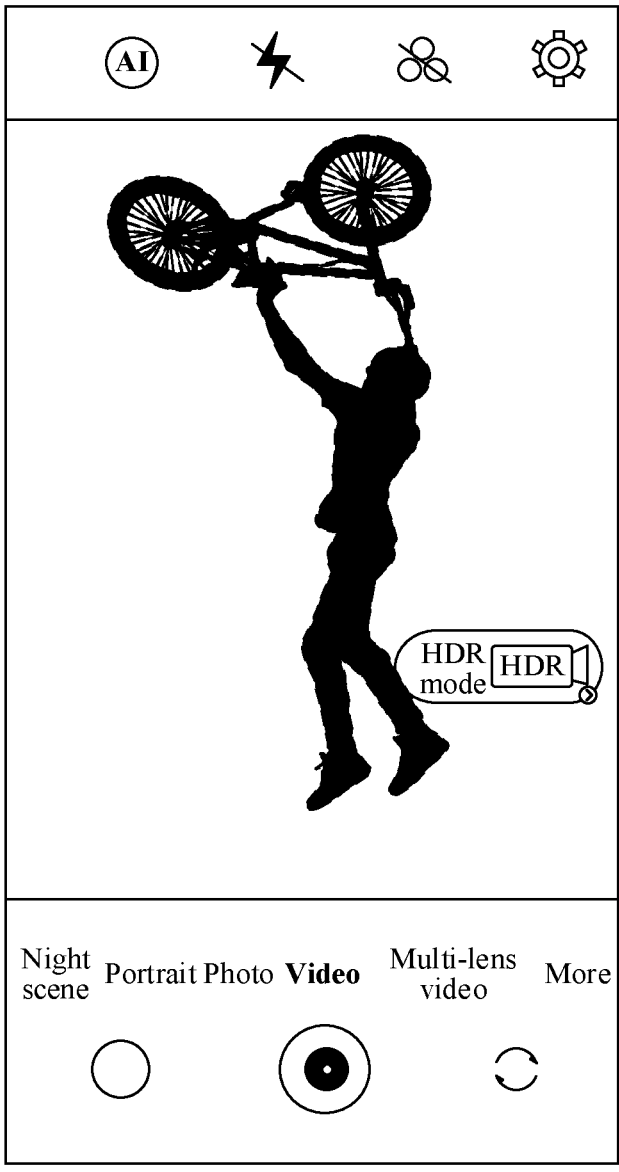

FIG. 5C is a schematic diagram of presenting text next to the icon of the HDR mode. A bottom plate exists below the text, and a display occasion of the bottom plate is the same as a display occasion of the text. A lateral length of the bottom plate may be telescoping as the text is expanded and collapsed. In actual applications, because the text is generally displayed above the preview interface in a floating manner, it may occur that colors of the text and the preview picture below the text are similar. In this case, the user is less likely to see specific content of the text. Therefore, in embodiments of this application, the bottom plate may also be displayed below the text, and a color of the bottom plate is contrasted with the color of the text, so that the user is more likely to see the specific content of the text, to know a specific mode of the currently recommended icon.

In actual applications, a maximum lateral length of the bottom plate is fixed, text of some sub-modes is shorter, and text of some sub-modes is longer so that the longer text may exceed the maximum lateral length of the bottom plate. In this case, to fully present text of a sub-mode, the text of the sub-mode may be controlled to be displayed in a lateral scrolling manner in a range of the bottom plate. For example, at a moment t1, text presented on the bottom plate is "HDR mo". At a moment t2, text presented on the bottom plate is "DR mode".

Refer to FIG. 6. The text and the bottom plate are simultaneously expanded and simultaneously collapsed.

Figure 5D:
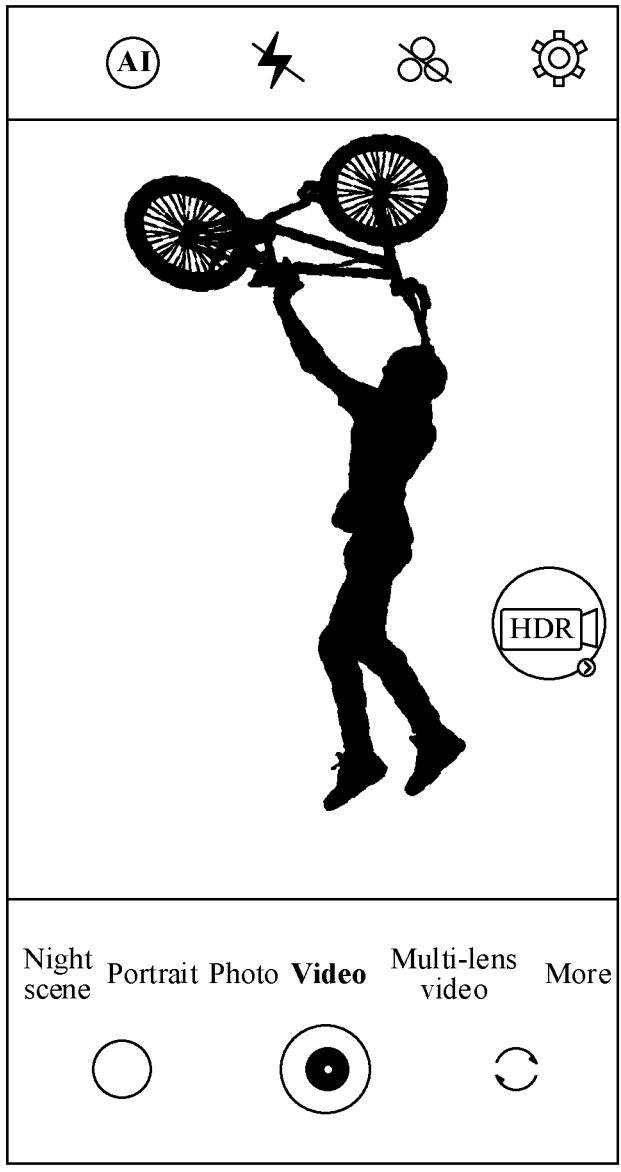

FIG. 5D is a schematic diagram of an icon of the HDR mode after the text and the bottom plate are collapsed. The icon is the same as the icon presented in FIG. 5B. In other words, after the text and the bottom plate are collapsed, the icon of the HDR mode shown in FIG. 5B is restored to.

After the text and the bottom plate are fully collapsed into the icon shown in FIG. 5D, the icon of the HDR mode shown in FIG. 5D is always displayed.

Certainly, in actual applications, there may be some cases that cause the preview interface to not display the icon of the HDR mode.

In an example, after the user taps on the icon to trigger the electronic device to enter the HDR mode, the electronic device displays a preview interface of the HDR mode (for details, refer to descriptions of subsequent embodiments), where the icon of the HDR mode may not be displayed on the preview interface of HDR mode.

In another example, after the electronic device detects that the recommendation condition of the HDR mode is met, the electronic device does not display the icon of the HDR mode on the currently displayed preview interface of the video recording function.

In the embodiment shown in FIG. 6, time lengths of time periods do not indicate time lengths in an absolute sense, and the time lengths of the time periods may be set according to an actual case. Specific duration of the time periods is not limited in embodiments of this application.

In the foregoing recommendation process of the HDR mode in FIG. 5A to FIG. 5D, if the user taps on an AI control on the preview interface, in response to the operation, the electronic device cancels the recommendation of the HDR mode, and the icon of the HDR mode is not displayed on the preview interface. If it is detected that a condition for canceling recommendation of the HDR mode is currently met, the electronic device may also cancel the recommendation of the HDR mode.

To avoid frequent switching by the electronic device between recommendation and recommendation cancellation for a sub-mode, a condition for canceling recommendation of the sub-mode may be set to include duration. For example, the condition for canceling recommendation of the HDR mode may be that the recommendation of the HDR mode is canceled when it is detected that duration for which a distance between an object and the camera is greater than 17 cm is longer than 2 seconds.

When the electronic device recommends the HDR mode, the display process and the disappearance process of the recommendation symbol generally take up about 1 second, the text expansion process takes up generally a plurality of hundred milliseconds, and the text presentation or scrolling process takes up about 2 seconds. Therefore, in the process in which the electronic device recommends the HDR mode, at a text presentation or scrolling stage, at a text collapse stage, or after the text is fully collapsed, it may be determined that the cancellation recommendation condition of the HDR mode is met.

If it is detected that the condition for canceling recommendation of the HDR mode is met at the text presentation or scrolling stage, the text presentation or scrolling process may be continuously presented on the preview stage; after the text presentation or scrolling process ends, the collapse processes of the text and the bottom plate are continuously presented; and after the text and the bottom plate are fully collapsed, the HDR icon disappears (where the disappearance process may also be a gradually transparent process). In other words, the recommendation of the HDR mode is canceled. Certainly, the text and the bottom plate may alternatively be immediately collapsed, and the HDR icon simultaneously disappears (where the disappearance process may also be a gradually transparent process).

If it is detected that the condition for canceling recommendation of the HDR mode is met at collapse stages of the text and the bottom plate, the collapse processes of the text and the bottom plate may be continuously presented on the preview stage; and after the text and the bottom plate are fully collapsed, the HDR icon disappears (where the disappearance process may also be a gradually transparent process). In other words, the recommendation of the HDR mode is canceled. Certainly, the text and the bottom plate may alternatively be immediately collapsed, and the HDR icon simultaneously disappears (where the disappearance process may also be a gradually transparent process).

If it is detected that the condition for canceling recommendation of the HDR mode is met after the text and the bottom plate are fully collapsed (only the HDR icon is displayed), the HDR icon on the preview interface disappears (where the disappearance process may also be a gradually transparent process). In other words, the recommendation of the HDR mode is canceled.

Certainly, in actual applications, duration from the start of the recommendation animation effect to the end of the text presentation or scrolling process may be 3 seconds or more (which is not much different from 2 seconds in the condition for canceling recommendation). Therefore, a case that the recommendation condition of the mode is met during the period is less, and even if the HDR icon disappears after the animation effect presentation of the text and the bottom plate is completed (that is, the text and the bottom plate are fully collapsed), user experience is not affected. Therefore, during specific implementation, there is no limitation on a specific interface change process when it is detected that the condition for canceling recommendation of the HDR mode is met before the text and the bottom plate are fully collapsed.

In another embodiment of this application, when the electronic device determines for the first time that the recommendation condition of the HDR mode is currently met and starts to display the recommendation animation effect, to avoid that the user does not know a meaning of the recommendation icon of the HDR mode or does not know how to use the HDR mode, text information may be used for a prompt guidance.

Figure 7:
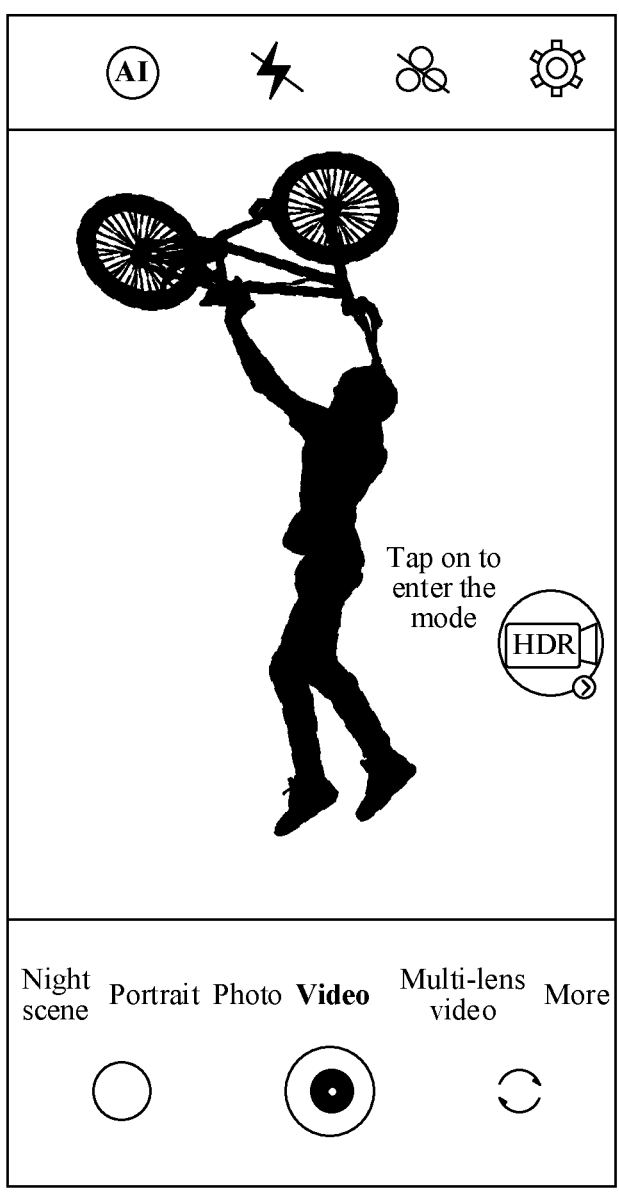
FIG. 7 is a schematic diagram of an interface on which text prompt information is displayed when an electronic device recommends an icon of an HDR mode for the first time according to an embodiment of this application.

In an example, refer to FIG. 6. If an operation by the user to tap on the icon of the HDR mode to enable the HDR mode is not received within duration (for example, 1 second, 2 seconds, 3 seconds, or 5 seconds) after the text and the bottom plate are fully collapsed and FIG. 5D is displayed, text "tap on to enter the mode" is displayed on the recommendation icon of HDR mode. For details, refer to an interface shown in FIG. 7.

Certainly, after the text "tap on to enter the mode" is presented for specific duration (for example, 1 second) or the tap operation by the user on the icon is received or another operation by the user is received, the text "tap on to enter the mode" disappears.

When it is not determined for the first time that the recommendation condition of the HDR mode is currently met and the recommendation animation effect, the text guidance may not be used. Certainly, a more lightweight guidance manner may alternatively be used at a same occasion (at which the tap operation by the user on the icon of the HDR mode is not received within a period of time after the text and the bottom plate are collapsed).

In an example, a micro-motion effect (for example, small bounce) is set for the icon. This is not limited in embodiments of this application.

In this embodiment of this application, the "determining for the first time that the recommendation condition of the HDR mode is currently met" may be the first time after the electronic device leaves the factory or is reset to default settings or is recovered, or the first time after the electronic device is powered on, or the first time after the electronic device starts the camera application, or the first time after the electronic device enables the video recording function of the camera application. This is not limited in embodiments of this application.

In the presentation process of the recommendation animation effect of the HDR mode, the user may tap on the icon of the HDR mode to enable the HDR mode (enter the HDR mode); and after the user enables the HDR mode, the electronic device performs step S403 to step S405 in the foregoing embodiment. After the user taps on the "record control" for starting video recording, the electronic device starts to acquire the original picture by using the recording parameter of the HDR mode, processes the original picture based on the algorithm of HDR mode, to obtain the video recorded in the HDR mode.

In actual applications, it may be set that after the icon of the HDR mode appears, the electronic device may respond to the tap operation by the user on the icon of the HDR mode to enter the HDR mode.

Certainly, in actual applications, it may alternatively be set that the electronic device may respond to the tap operation on the icon of the HDR mode within some time periods, to enter the HDR mode; and does not respond to the tap operation on the icon of the HDR mode with some other time periods.

In an example, when the recommendation animation effect progresses to a time period within which the text is expanded or scrolled and a time period after the text and the bottom plate are collapsed shown in FIG. 6, the electronic device may respond to the tap operation on the icon of the HDR mode within the two time periods, to enter the HDR mode.

It should be noted that the foregoing time period is only for example, and in actual applications, a time period different from the set and listed time periods may alternatively be set as a time period within which the electronic device may respond to the tap operation on the icon. Certainly, a recommendation animation effect different from that in the foregoing embodiment may alternatively be used, to select a part or all of time periods in the actually used recommendation animation effect as time periods within which the electronic device may respond to the tap operation on the icon.

In addition, for a sub-mode that cannot be directly entered by the electronic device and that can be entered by the electronic device through a trigger of the user, before the electronic device receives a trigger operation by the user, an icon of the sub-mode is a white (or black) icon. In other words, an initial state of the currently recommended sub-mode that cannot be directly entered is a disabled state. The user needs to tap on the icon in the disabled state, to trigger the sub-mode to be switched to an enabled state.

Certainly, in actual applications, the icon of the sub-mode in the disabled state may alternatively be presented in another form. For example, a slash may be added on the icon of the sub-mode, in other words, the icon on which the slash is added indicates that the sub-mode is currently in the disabled state.

Correspondingly, when the user taps on the icon of the sub-mode in the disabled state, the user enables the sub-mode in response to the tap operation, and the white (or black) icon on the preview interface corresponding to the video recording function is simultaneously presented as an icon in another color or a colored icon. Certainly, when the user taps the icon of the sub-mode in the enabled state, the electronic device disables the sub-mode in response to the tap operation, and the icon in the another color or the colored icon on the preview interface corresponding to the video recording function is simultaneously presented as the white (or black) icon.

In another embodiment of this application, the user taps on the icon of the HDR mode within a time period within which the electronic device may respond to a tap operation on the icon of the HDR mode. In response to the operation (where an operation acting on an icon of a video recording mode that cannot be directly entered may be denoted as a first operation, for example, a single tap operation), the electronic device displays a preview interface of the HDR mode shown in FIG. 8. In other words, after the electronic device enters the sub-mode that cannot be directly entered, the electronic device presents a preview interface set for the sub-mode, rather than the preview interface common to the video recording function. In this embodiment of this application, the preview interface of the video recording mode that cannot be directly entered may be denoted as a second preview interface.

Figure 8:
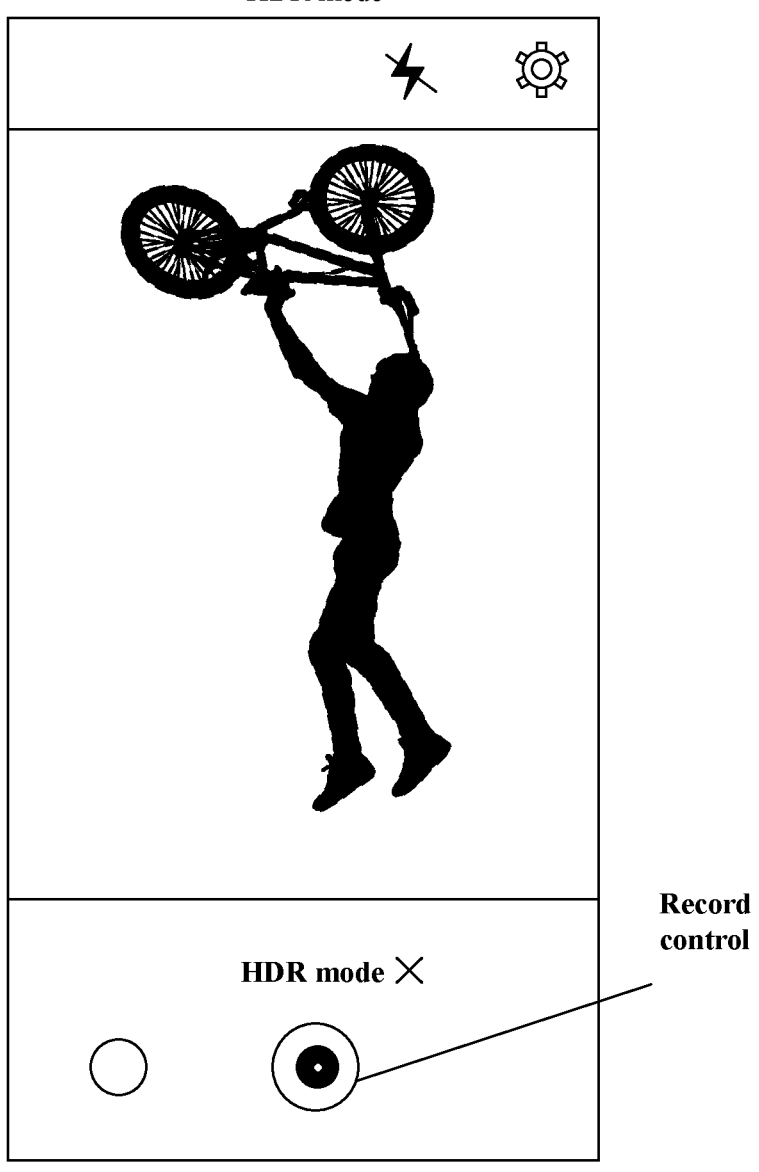
FIG. 8 is a schematic diagram of a preview interface of a video recording mode that cannot be directly entered according to an embodiment of this application.

The HDR mode and the "record control" for start video recording are displayed on the preview interface shown in FIG. 8. If the user taps on the record control, after the tap operation on the record control is received, the electronic device starts video recording by using the recording parameter of the HDR mode provided by the AI function, and generates a recorded video based on the algorithm of the HDR mode provided by the AI function.

If the user does not intend to use the HDR mode to perform video recording, a disable button "x" on a right side of the HDR mode may be taped on (where a disable button on the preview interface corresponding to the video recording mode that cannot be directly entered may be denoted as a first control, and an operation on the first control may be denoted as a fourth operation), to trigger the electronic device to disable the second video recording mode or cancel the recommendation of the HDR mode. In other words, during specific implementation, the disable button "x" may be set to disable the HDR mode; or the disable button "x" may be set to cancel the recommendation of the HDR mode.

In an embodiment in which the disable button is to disable the HDR mode, after it is detected that the user taps on the disable button, the electronic device may switch the interface shown in FIG. 8 to the interface shown in FIG. 5D. Subsequently, the user may also trigger, by taping on the icon of the HDR mode on the interface shown in FIG. 5D, the electronic device to enable the HDR mode to display the preview interface of the HDR mode shown in FIG. 8.

In an embodiment in which the disable button is to cancel the recommendation of the HDR mode, after it is detected that the user taps on the disable button, the electronic device switches the interface shown in FIG. 8 to the interface shown in (d) in FIG. 3, that is, the electronic device does not recommend the HDR mode on the preview interface of the video recording function.

A specific solution to be used may be set according to an actual case.

In another embodiment of this application, the preview interface corresponding to the foregoing video recording function may also include another control, for example, a focal length control (where 0.5, 1, 2, 3, and 6 shown in the figure each indicate a different focal length), and the user may trigger the electronic device to switch a current focal length through an operation (tap or slide) on the focal length control. Which number that "x" is behind indicates which focal length is currently used.

Figure 9:
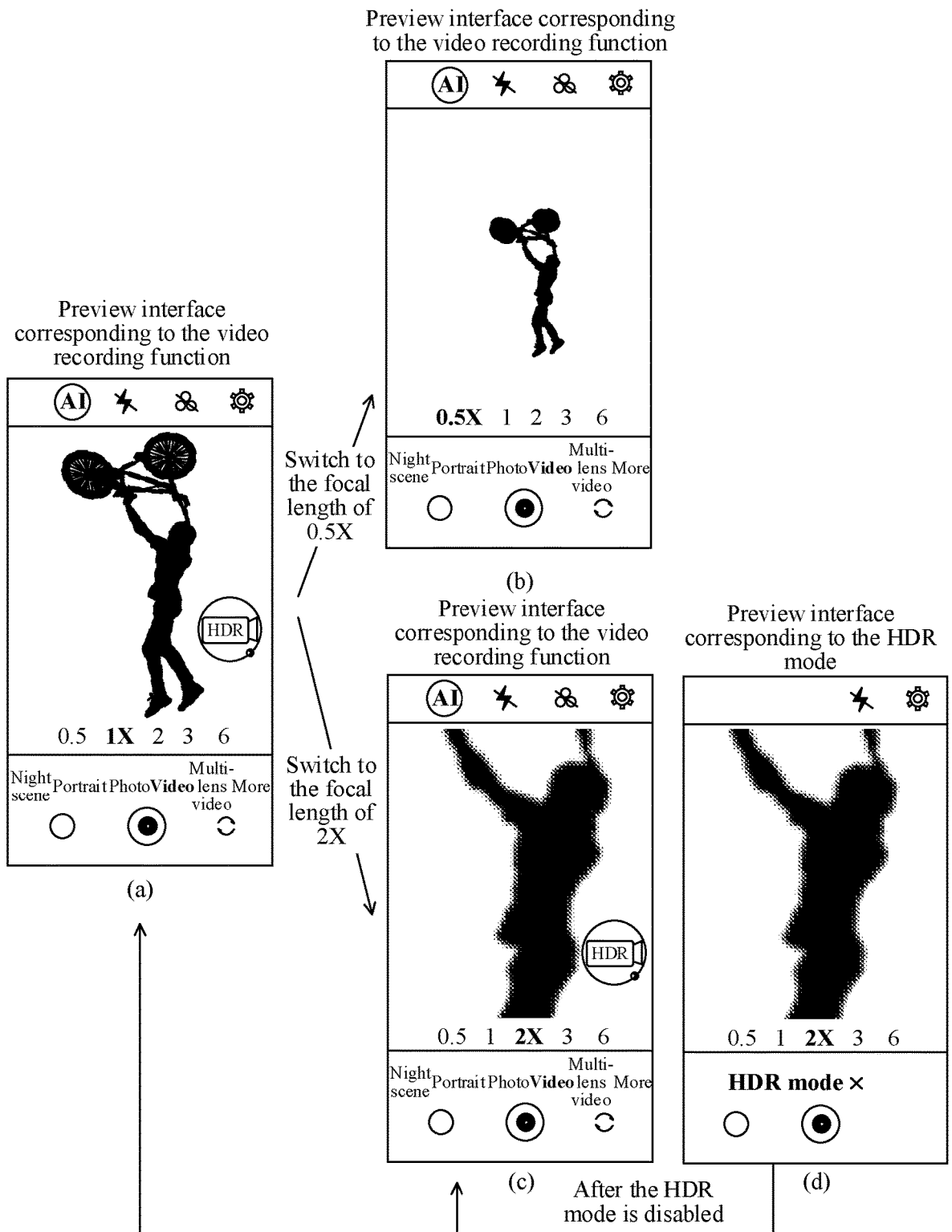
FIG. 9 is a schematic diagram of a change of an interface corresponding to a focal length adjustment operation when an electronic device recommends a video recording mode according to an embodiment of this application.

It is assumed that the HDR mode in this embodiment of this application supports recording with only the focal lengths of 1× and 2×, and in the process in which the electronic device recommends the HDR mode, for example, in the process of displaying the icon of the HDR mode shown in (a) in FIG. 9, the user taps on the focal length of 0.5×. In this case, in response to the operation, the electronic device cancels the recommendation of the HDR mode, and does not display the icon of the HDR mode on the preview interface, and the focal length is simultaneously switched to the focal length of 0.5×. For details, refer to (b) in FIG. 9. Focal length multiples not supported in the video recording mode in this embodiment of this application include a second focal length (for example, the focal length of 0.5×).

In embodiments of this application, a zoom operation is only an example. In actual applications, if another recording parameter not supported in the current mode is used, it is determined that the user explicitly needs to use the recording parameter to perform video recording. In this case, the electronic device cancels the recommendation of the HDR mode, the HDR icon on the preview interface disappears, and the electronic device does not use the HDR mode to generate the preview interface and perform recording.

Generally, if the user selects the recording parameter not supported in the current mode through an operation on the preview interface, it indicates that the user has a strong willingness to select the recording parameter not supported in the current mode to perform recording. In this case, to improve user experience, the electronic device may cancel the recommendation of the HDR mode, and generate the preview picture and perform recording by using the recording parameter selected by the user.

Certainly, if the user taps on the focal length of 2× in the process of displaying the icon of the HDR mode shown in (a) in FIG. 9, the electronic device continuously recommends and presents the icon of the HDR mode, and switches the focal length to the focal length of 2×. For details, refer to (c) in FIG. 9. In other words, the user may continuously tap on the icon of the HDR mode, to trigger the electronic device to enable the HDR mode. In this embodiment of this application, focal length multiples supported in the video recording mode include a first focal length (for example, the focal length of 1×) and a third focal length (for example, the focal length of 2×). Certainly, in actual applications, other focal length multiples may be supported.

In a scene of an interface shown in (c) in FIG. 9, if the user taps on the icon of the HDR mode, the electronic device displays a preview interface of the HDR mode shown in (d) in FIG. 9, where a focal length (focal length of 2×) on the interface is consistent with the focal length (focal length of 2×) before the HDR mode is enabled.

Generally, when the user modifies a default focal length multiple of the camera through an operation on the electronic device, it indicates that the user has a strong willingness to perform video recording with the modified focal length multiple. Therefore, the focal length (focal length of 2×) on the interface can be set to be consistent with the focal length (focal length of 2×) before the HDR mode is enabled, thereby improving user experience.

Certainly, in a scene of the interface shown in (d) in FIG. 9, if the user taps on a disable button "x" on a right side of the HDR mode, the electronic device disables the HDR mode or cancels the recommendation of the HDR mode. In addition, the focal length may be restored to the default focal length of 1× or the focal length of 2× before the HDR mode is enabled. This is not limited in embodiments of this application.

In the scene of the interface shown in (d) in FIG. 9, if the user taps on a "record control" (in this embodiment of this application, a control for starting to record may be denoted as a second control), the electronic device performs video recording based on the HDR mode and the focal length of 2×.

In another embodiment of this application, the user taps on a "record control" on the interface shown in (c) in FIG. 9. Because the HDR mode is currently in the disabled state, the electronic device does not use the HDR mode to perform video recording, but uses the default mode of the video recording function to perform video recording.

It should be noted that the HDR mode is used as an example in the foregoing embodiments, and in actual applications, the HDR mode in the foregoing examples may be replaced with any sub-mode that cannot be directly entered by the electronic device.

The following describes an interface change process in a recommendation process in which when the electronic device determines that a recommendation condition of a sub-mode is currently met, the electronic device can directly enter the sub-mode. For example, the sub-mode that can be directly entered by the electronic device is the macro mode.

When the AI function is enabled, if the electronic device determines that a recommendation condition corresponding to the macro mode is currently met based on the preview picture acquired by the camera in real time and/or the acquisition parameter, the electronic device presents a recommendation animation effect of the macro mode. The recommendation animation effect is displayed above a preview interface of a video recording function in a floating manner.

It should be noted that the recommendation animation effect of the macro mode is the same as the recommendation animation effect of the HDR mode, but icons and text presentation content are different. For the mode that can be directly entered, the preview interface of the video recording function is used, and a preview interface of the mode may not be provided separately. For ease of understanding, the display process of the recommendation animation effect is described below with reference to schematic diagrams of a change of an interface shown in FIG. 10A to FIG. 10D and a time relationship of the change of the interface shown in FIG. 6.

Figure 10A:
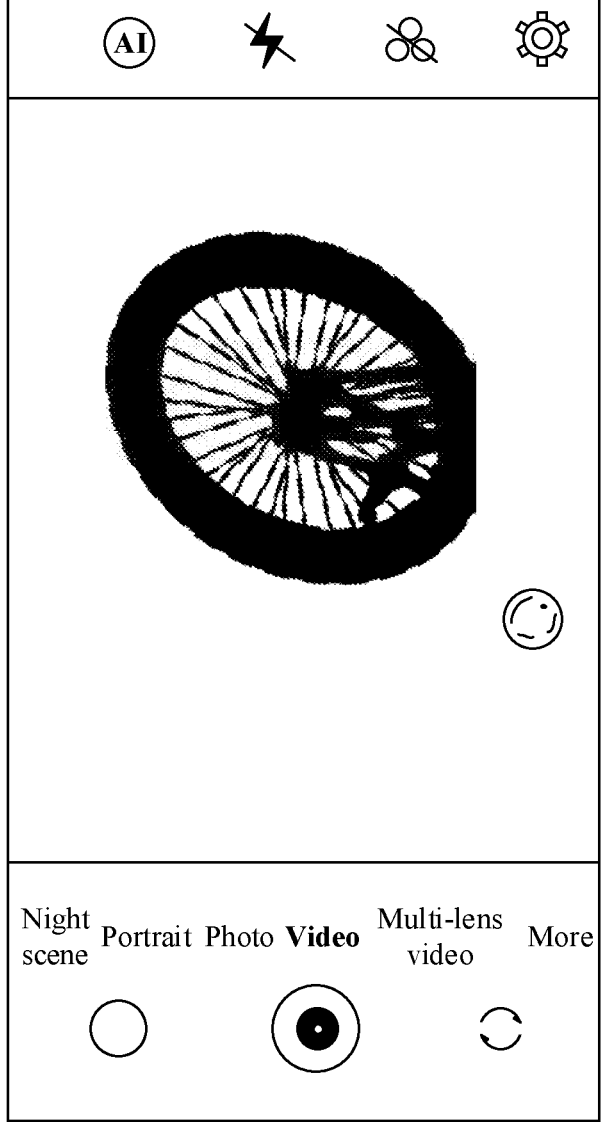
FIG. 10A to FIG. 10D are schematic diagrams of a change of an interface when an electronic device recommends a video recording mode that can be directly entered according to an embodiment of this application.

Refer to FIG. 10A. The electronic device first displays a recommendation symbol on the preview interface of the video recording function. For descriptions of the recommendation symbol, refer to the descriptions in the embodiment shown in FIG. 5A to FIG. 5D.

Refer to FIG. 6. In a disappearance process of the recommendation symbol, an icon of the macro mode appears. For the appearance process of the icon, refer to the descriptions in the embodiment shown in FIG. 5A to FIG. 5D.

Figure 10B:
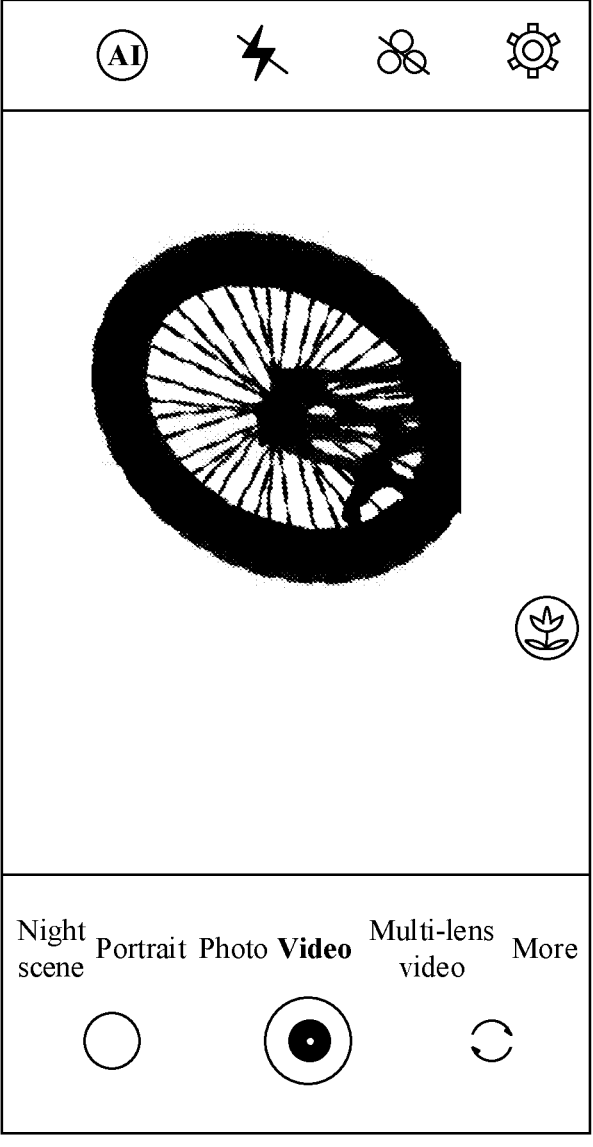

Refer to FIG. 10B. The icon of the macro mode is displayed by the electronic device on the preview interface of the video recording function. After the icon of the macro mode appears on the preview interface, the icon of the macro mode may be displayed on the preview interface of the video recording function until the electronic device cancels the recommendation of the macro mode.

Refer to FIG. 6. After the recommendation symbol disappears and the icon appears, text "macro mode" corresponding to the macro mode is displayed. The text corresponding to the macro mode includes a text expansion process, a text presentation (or scrolling) process, and a text collapse process.

Figure 10C:
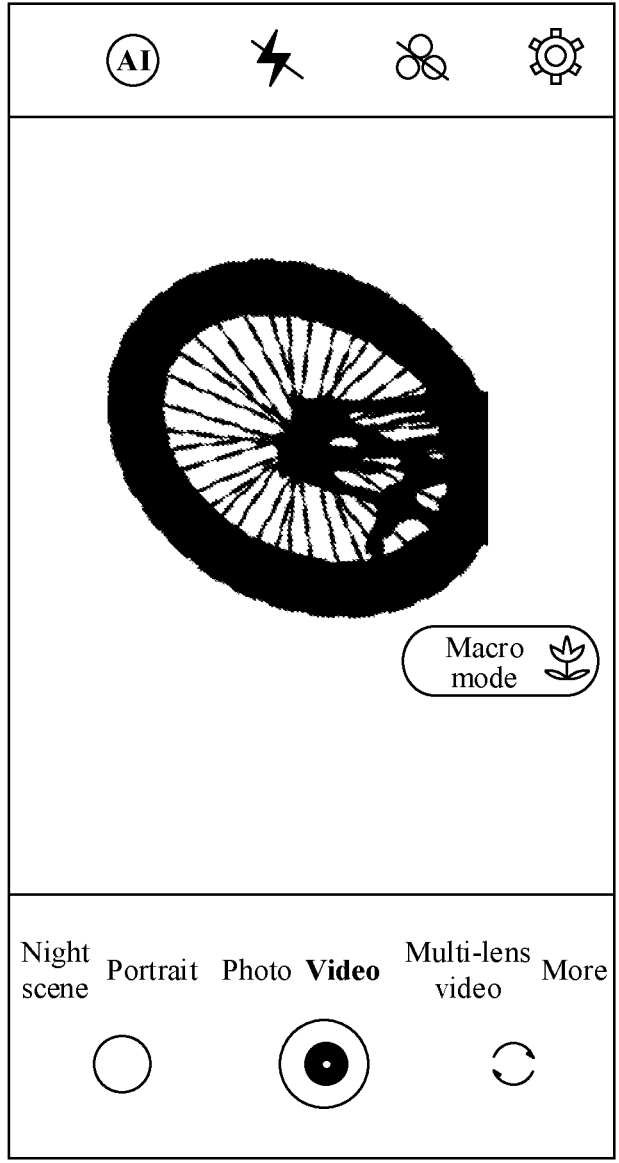

FIG. 10C is a schematic diagram of presenting text next to the icon of the macro mode. A bottom plate exists below the text, and a display occasion of the bottom plate is the same as a display occasion of the text. A lateral length of the bottom plate may be telescoping as the text is expanded and collapsed.

In actual applications, a maximum lateral length of the bottom plate is fixed, text of some sub-modes is shorter, and text of some sub-modes is longer so that the maximum lateral length of the bottom plate may be exceeded. In this case, to fully present text of a sub-mode, the text of the sub-mode may be controlled to be displayed in a lateral scrolling manner in a range of the bottom plate. For example, at a moment t1, text presented on the bottom plate is "macro mo". At a moment t2, text presented on the bottom plate is "cro mode".

Refer to FIG. 6. The text and the bottom plate are simultaneously expanded and simultaneously collapsed.

Figure 10D:
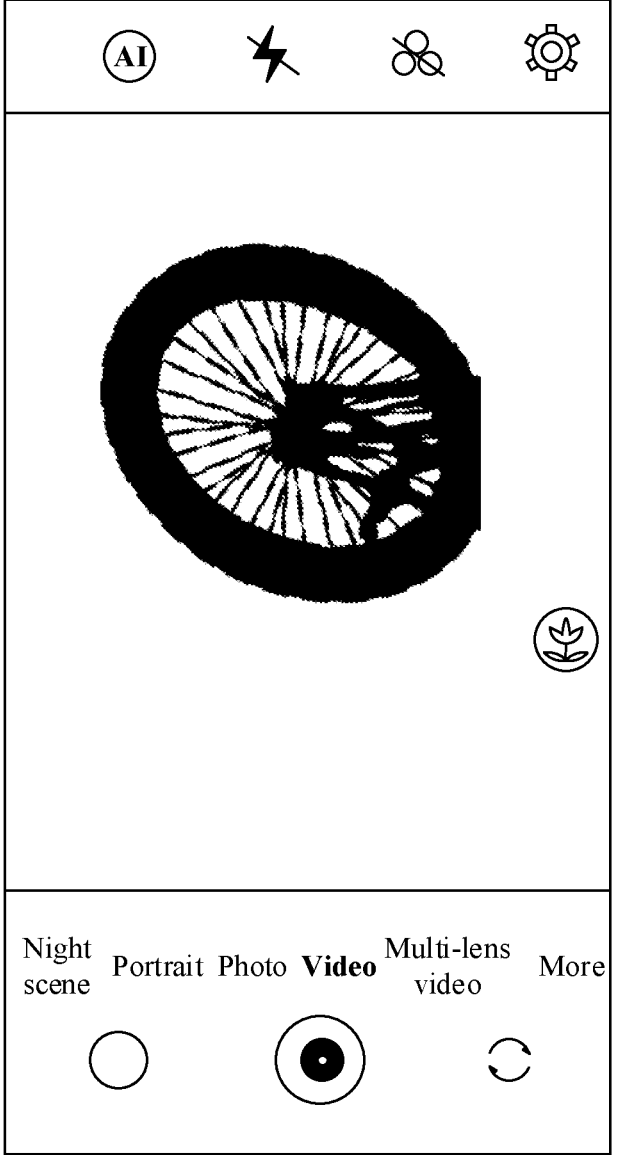

FIG. 10D is a schematic diagram of an icon of the macro mode after the text and the bottom plate are collapsed. The icon is the same as the icon presented in FIG. 10B. In other words, after the text and the bottom plate are collapsed, the icon of the macro mode shown in FIG. 10B is restored to.

After the text and the bottom plate are fully collapsed into the icon shown in FIG. 10D, the icon of the macro mode shown in FIG. 10D is displayed until the recommendation of the macro mode is canceled or the electronic device starts video recording in the macro mode.

In the process in which the electronic device recommends the icon of the macro mode, for descriptions of a time period in which the electronic device may respond to a tap operation on the macro icon to enter the macro mode, refer to related descriptions in the foregoing HDR mode. Details are not described herein again.

In addition, it should be noted that in a recording process in the macro mode, namely, a sub-mode that can be directly entered by the electronic device, the icon of the mode may not be displayed.

In another embodiment of this application, when the electronic device determines for the first time that the recommendation condition of the macro mode is currently met and starts to display the recommendation animation effect, to avoid that the user does not know a meaning of the recommendation icon of the macro mode or does not know how to use the macro mode, text information may be used for a prompt guidance. For descriptions of the text guidance process, refer to related descriptions in the foregoing HDR mode. Details are not described herein again.

As described above, the preview interface of the macro mode and the preview interface of the video recording function are a same interface. To distinguish whether the macro mode is currently in the enabled state or the disabled state, the icon of the macro mode in the enabled state may be set to be different from the icon of the macro mode in the disabled state.

In an example, when the electronic device determines that the recommendation condition of the macro mode is currently met, the electronic device presents the recommendation animation effect of the macro mode on the preview interface of the video recording function. When the icon of the macro mode is displayed, the icon is directly displayed in a non-black-and-non-white color or in a colorful manner, to indicate that the macro mode is currently enabled (in other words, an initial state of the video recording mode that can be directly entered is the enabled state). When the icon of the macro mode is displayed in black or white, it indicates that the macro mode is in the disabled state.

Figure 11A:
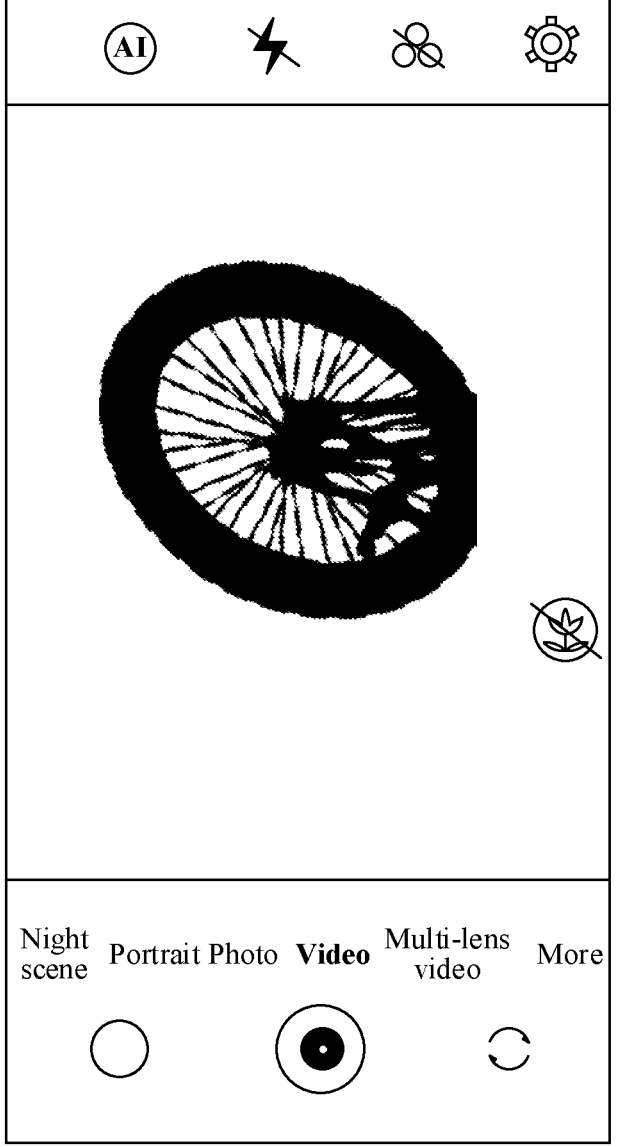
FIG. 11A to FIG. 11C are schematic diagrams of an interface when an icon of a video recording mode that can be directly entered is in different states according to an embodiment of this application.
Figure 11B:
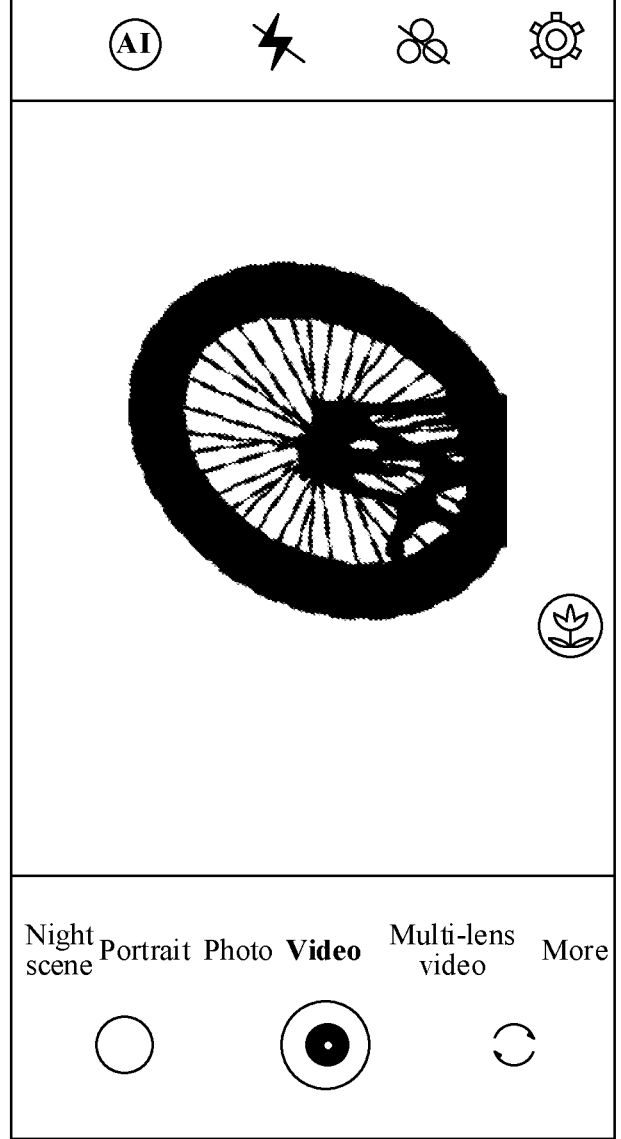
Figure 11C:
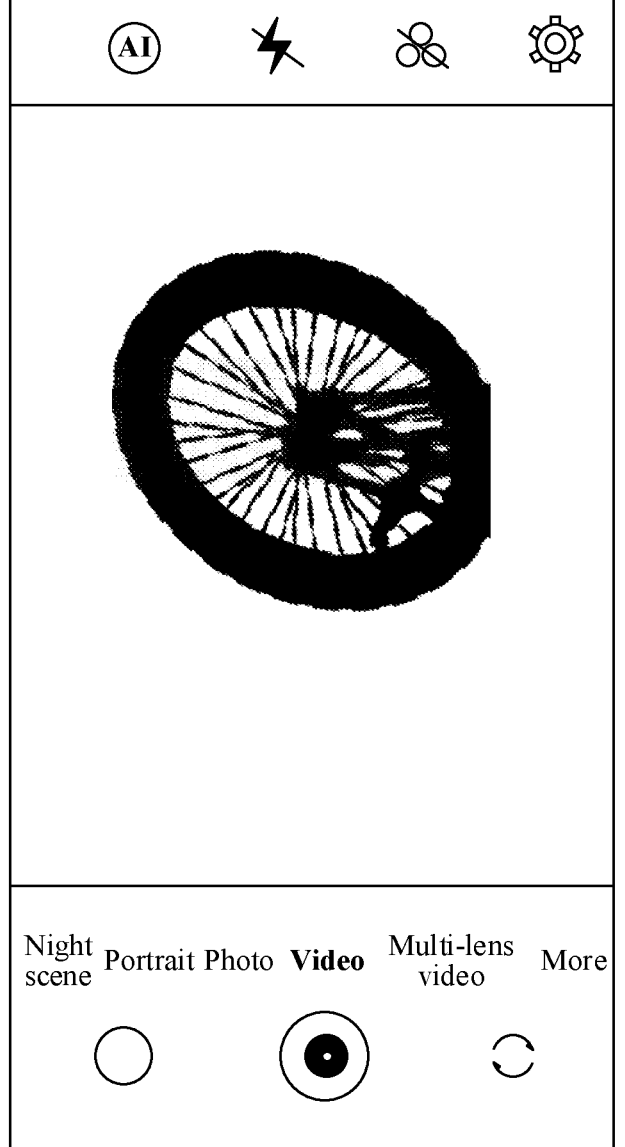

In another example, refer to the icon of the macro mode shown in FIG. 11A. When a slash is displayed on the icon of the macro mode, it indicates that the macro mode is in the disabled state. Refer to the icon of the macro mode shown in FIG. 11B. When there is no slash on the icon of the macro mode, the macro mode is in the enabled state. Refer to the preview interface of the video recording function shown in FIG. 11C. When the macro icon on the preview interface disappears, it indicates that the recommendation of the macro mode has been currently canceled.

If the user taps on the icon of the macro mode in the enabled state (as an example of a second operation acting on an icon of the video recording mode that can be directly entered), in response to the operation, the electronic device disables the macro mode; and the electronic device does not use a recording parameter provided by the AI function for the macro mode to acquire an original picture, and does not use an algorithm provided by the AI function for the macro mode to process the original picture, but acquires a preview picture by using a default recording parameter and algorithm of the video recording function of the electronic device.

If the user taps on the icon of the macro mode in the disabled state (as an example of a third operation acting on the icon of the video recording mode that can be directly entered), in response to operation, the electronic device enables the macro mode; and the electronic device acquires an original picture by using the recording parameter provided by the AI function for the macro mode, and processes the original picture based on the algorithm provided by the AI function for the macro mode, to obtain a preview picture.

In another embodiment of this application, the preview interface corresponding to the video recording function may also include another control, for example, a focal length control, and the user may trigger the electronic device to switch a current focal length through an operation (tap or slide) on the focal length control.

For a change of an interface when the user selects a focal length multiple supported in the macro mode and a change of an interface when the user selects a focal length multiple not supported in the macro mode, refer to related descriptions in the foregoing HDR mode. Details are not described herein again.

Figure 12A:
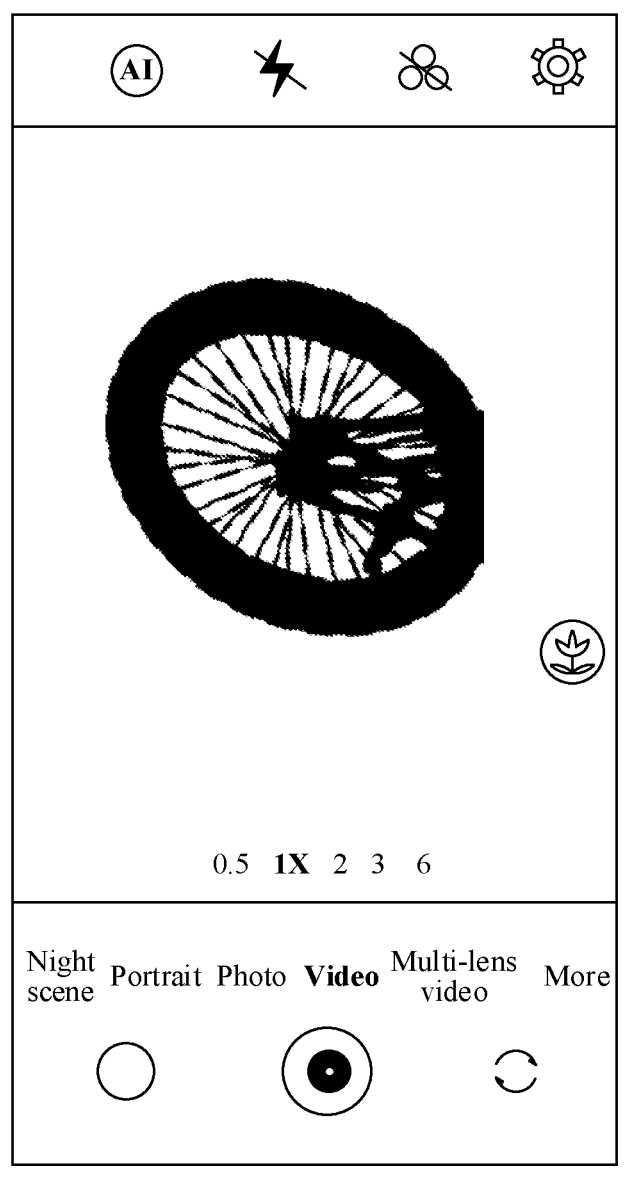
FIG. 12A to FIG. 12F are schematic diagrams of a change of an interface when an electronic device switches a video recording mode according to an embodiment of this application.

In another embodiment of a mode that can be automatically entered by the electronic device, refer to FIG. 12A. When it is detected that the recommendation condition of the macro mode is currently met, the electronic device directly enters the macro mode.

Figure 12B:
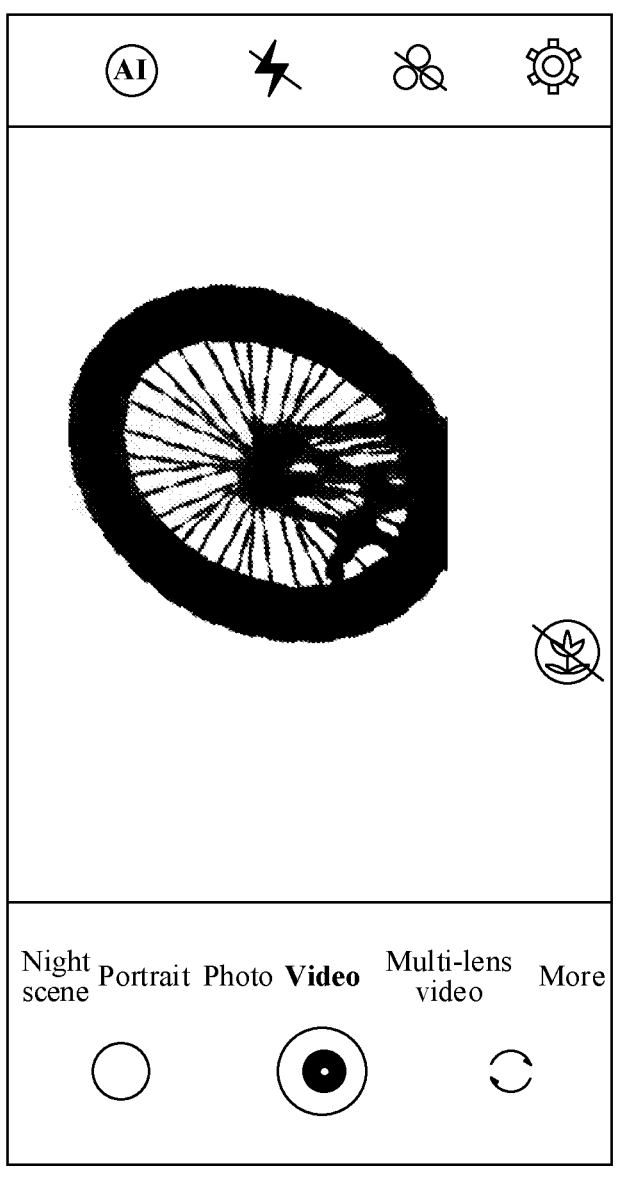

Subsequently, refer to FIG. 12B. If the user manually disables the macro mode, the electronic device disables the macro mode in response to the operation, and a slash is displayed on the icon of the macro mode on the preview interface of the video recording function.

Subsequently, refer to FIG. 12C. If the user holds the electronic device to move in a capturing space, when the electronic device detects that a condition for canceling recommendation of the macro mode is currently met and a recommendation condition of another mode (for example, the portrait mode) is met, the electronic device cancels the recommendation of the macro mode, and recommends the another mode.

Figure 12C:
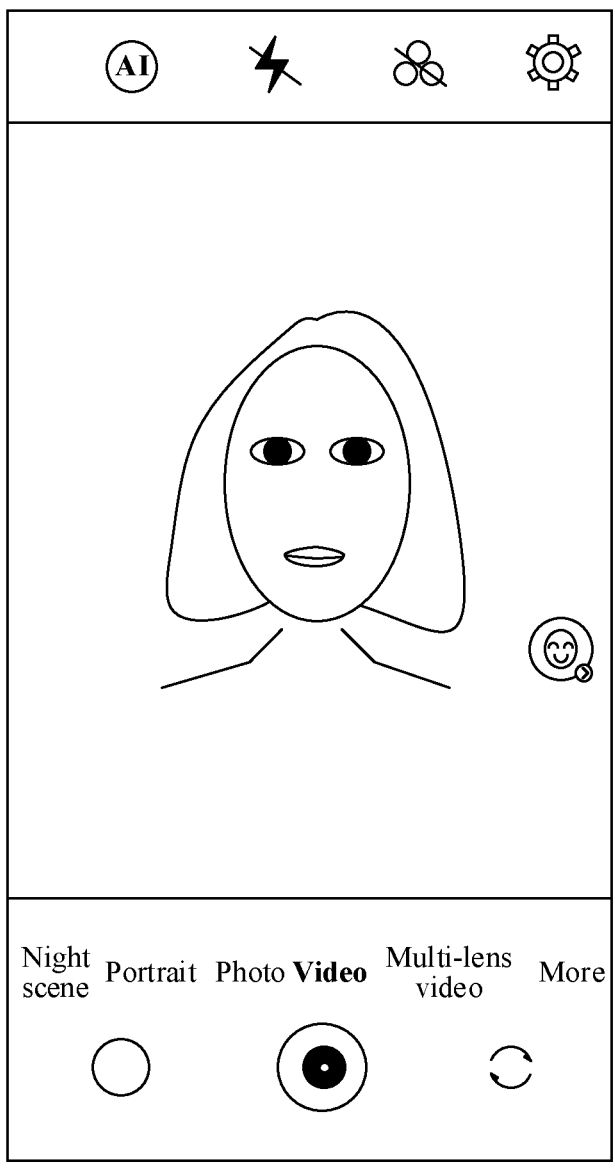

In another example in which the electronic device displays FIG. 12C, in actual applications, if the user holds the electronic device to move in the capturing space, when the electronic device detects that the condition for canceling recommendation of the macro mode is currently met, the electronic device cancels the recommendation of the macro mode, and the icon of the macro mode is not displayed on the preview interface. If the user continuously holds the electronic device to move in the capturing space, when the electronic device detects that a recommendation condition of another mode (for example, the portrait mode) is currently met, the electronic device recommends the another mode, and an icon of the another mode is displayed on the preview interface.

Figure 12D:
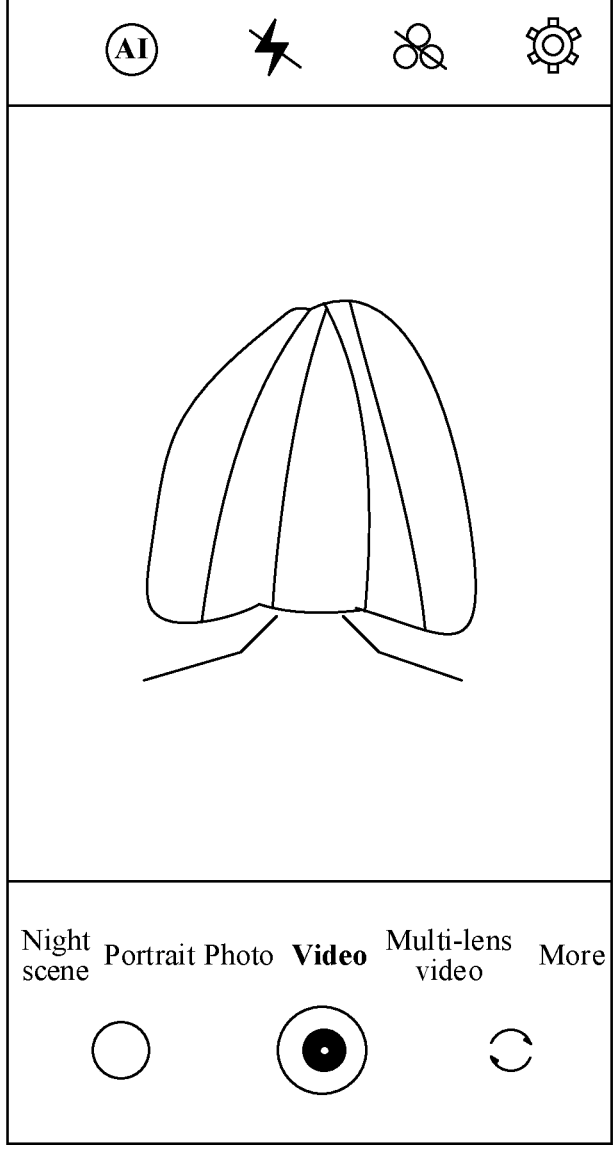

Subsequently, refer to FIG. 12D. The user continuously holds the electronic device to move in the capturing space, when the electronic device detects that a condition for canceling recommendation of the another mode (for example, the portrait mode) is currently met, the electronic device cancels the recommendation of the another mode, and the icon of the another mode is not displayed on the preview interface of the video recording function.

Subsequently, refer to FIG. 12E. If the user continuously holds the electronic device to move in the capturing space, when the electronic device detects that the recommendation condition of the macro mode (for example, the portrait mode) is currently met, the electronic device recommends the macro mode. When the electronic device recommends a same video recording mode again after the current video recording mode is enabled (for example, the macro mode is recommended for the second time), the presentation processes of the recommendation symbol and the text of the macro mode may not be displayed, but the icon of the same video recording mode is directly displayed.

In this application, when a video recording mode is recommended for the first time after the video recording function is enabled, the recommendation animation effect shown in the foregoing embodiment may be recommended to the video recording mode starting from displaying a recommendation symbol. However, the recommendation symbol is generally used to remind that the video recording mode will be recommended, and is not used to distinguish video recording modes. To avoid interference with the user caused by presence of a bubble when the video recording mode is subsequently recommended, the displaying of the recommendation symbol may be canceled during recommendation not for the first time after the video recording function is enabled.

When a video recording mode is recommended for the first time after the video recording function is enabled, text information and a bottom plate of the video recording mode may be displayed, to remind the user of a meaning of an icon of the video recording mode. When the same video recording mode is not recommended for the first time after the current video recording function is enabled, there is no need to display the text information and the bottom plate again, to avoid interference with the user caused by the preview picture displayed at the bottom being blocked when the text information and the bottom plate of the same video recording mode are displayed again.

Figure 12E:
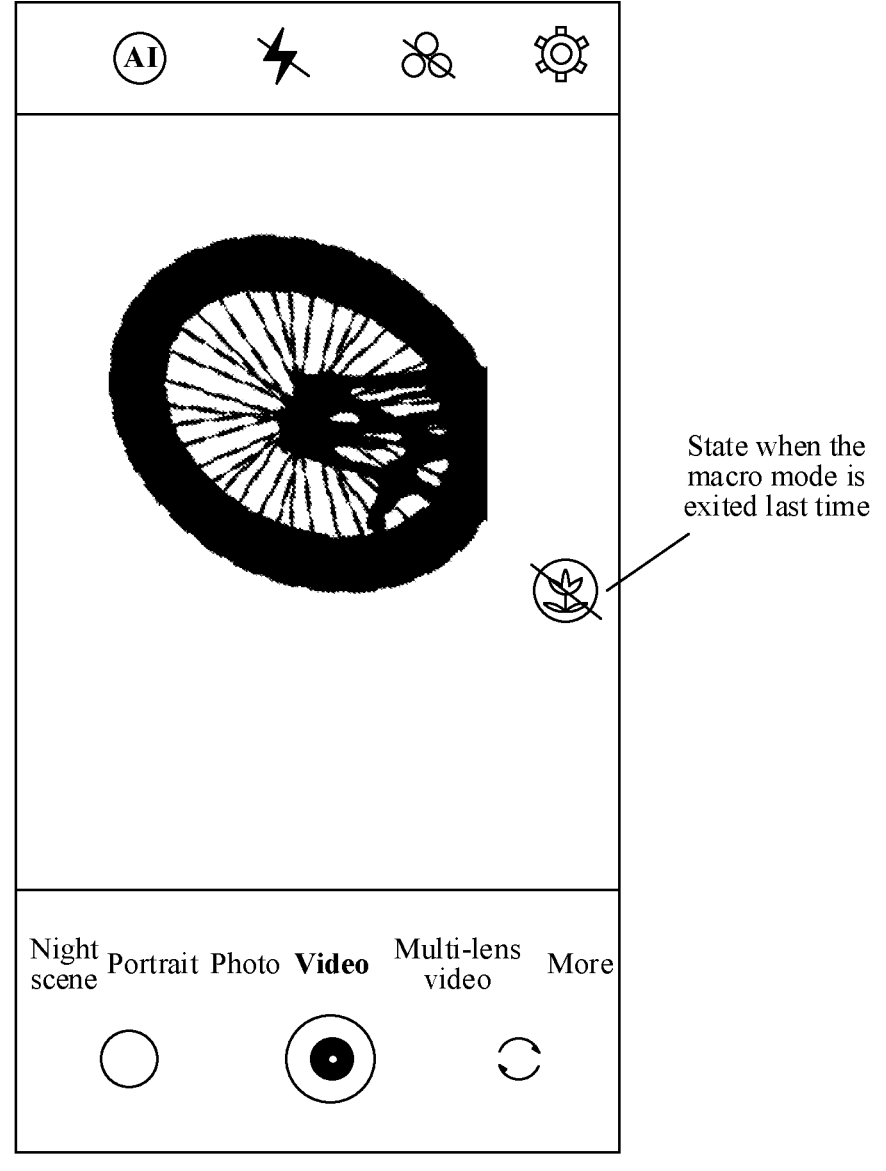

Refer to FIG. 12E. If a time interval between when the electronic device cancels the recommendation of the macro mode last time and when it is currently detected that the recommendation condition of the macro mode is met is short (for example, shorter than first duration), a state (for example, the disabled state) of the macro mode during current recommendation of the macro mode is determined based on a state of the macro mode before the recommendation of the macro mode is canceled last time. In addition, during the current recommendation of the macro mode, the presentation and disappearance processes of the recommendation symbol, and expansion, presentation, and collapse process of the text and the bottom plate are not executed.

In this application, it is assumed that when the electronic device cancels recommendation of a video recording mode last time, and an icon of the video recording mode is not in an initial state. In this case, when the video recording mode is recommended again, if a time interval between the recommendation twice is shorter, a state determined based on a use habit of the user last time may be used as an initial state when the same video recording mode is currently recommended. In the manner of learning the initial state during current recommendation based on the historical use habit of the user, the state during the current recommendation is more in line with the personal use habit of the user, thereby reducing switching again of the user, and improving experience of the user.

In embodiments of this application, trigger moments corresponding to the schematic diagrams of the foregoing interface may be denoted as different moments, and different moments may be distinguished by first, second, and the like. Descriptions related to the first moment, the second moment, and the like are only used to distinguish events corresponding to different moments, and do not have any other limiting effect. Names based on order in which the foregoing different events occur may not be moments with different numbers (numbering order is not equal to the order in which the events occur).

Figure 12F:
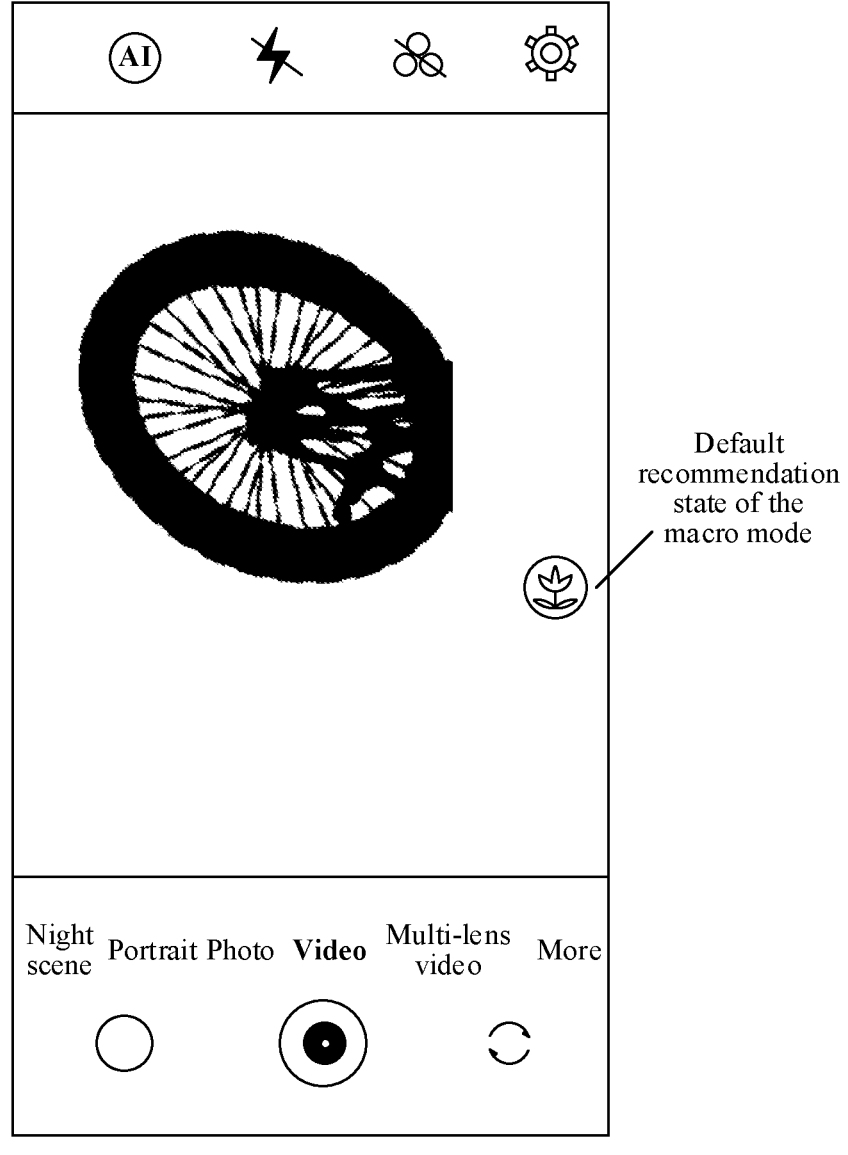

Refer to FIG. 12F. If the time interval between when the electronic device cancels the recommendation of the macro mode last time and when it is currently detected that the recommendation condition of the macro mode is met is long (for example, longer than or equal to the first duration), the state of the macro mode during the current recommendation of the macro mode is a recommendation state that the system defaults. The macro mode is a mode that can be directly entered by the electronic device, so that the macro mode is in the enabled state.

It should be noted that in this embodiment of this application, the macro mode is a mode that can be directly entered by the electronic device when determining that the recommendation condition of the macro mode is currently met. In actual applications, for a recommendation process of any mode that can be directly entered by the electronic device and an interface change process in the recommendation process, refer to the foregoing process in the electronic device recommends the macro mode and the interface change process.

In addition, some of the foregoing embodiments may be applied to the recommendation process of the sub-mode that can be directly entered by the electronic device, or may be applied to a recommendation process of a sub-mode that cannot be directly entered by the electronic device. A scope of a specific application is determined according to the logic inherent therein. It does not indicate that the embodiment in which the HDR mode is used as an example cannot be applied to the recommendation process of the sub-mode that can be directly entered by the electronic device, and it also does not indicate the embodiment in which the macro mode is used as an example cannot be applied to the recommendation process of the sub-mode that cannot be directly entered by the electronic device.

In embodiments of this application, in two video recording modes recommended by the electronic device in succession, a previous recommended video recording mode may be denoted as a first video recording mode (for example, the first video recording mode may be recommended at a first moment), and a corresponding scene may be denoted as a first scene; and a next recommended video recording mode may be denoted as a second video recording mode (for example, the second video recording mode may be recommended at a third moment), and a corresponding scene may be denoted as a second scene, where the third moment is later than the first moment. As described above, when the next video recording mode is recommended, the recommendation of the previous video recording mode may be first canceled, in other words, the recommendation of the first video recording mode may be canceled at a second moment. The second moment is between the first moment and the third moment. Certainly, types of the recommended two video recording modes are not limited.

The recommendation processes of two types of modes are described above. In actual applications, in a process in which the electronic device recommends a mode, the electronic device may also switch to recommend another mode. A possible switching process between modes is first described.

In embodiments of this application, when the electronic device determines that a recommendation condition of a sub-mode is met based on the preview picture acquired by the camera in real time and/or another acquisition parameter, the sub-mode may be directly entered, or the sub-mode may be recommended to the user so that the user selects to trigger the electronic device to enter the sub-mode. When the electronic device currently recommends a sub-mode in the video recording mode, the electronic device needs to detect whether a condition for canceling recommendation of the sub-mode is currently met, to cancel the recommendation of the sub-mode when the condition for canceling recommendation of the sub-mode is met.

The electronic device may also determine that recommendation conditions of a plurality of sub-modes are currently met based on the preview picture acquired by the camera in real time and/or another acquisition parameter. If the electronic device determines that the recommendation conditions of the plurality of sub-modes are currently met, the plurality of sub-modes may be recommended to the user simultaneously, and the user selects which sub-mode the electronic device triggers to enter.

In actual applications, priorities may also be set for the plurality of sub-modes. The electronic device recommends a sub-mode with a higher priority or enters the sub-mode with the higher priority.

In an example, the modes may be set to be sorted in descending order of priorities thereof: the macro mode, the night scene mode, the portrait mode, the HDR mode, the protagonist mode, multi-lens video recording, and the like.

In another example, the modes may also be set to be sorted in descending order of priorities thereof: the macro mode, the night scene mode, the HDR mode, the portrait mode, the protagonist mode, multi-lens video recording, and the like.

The settings for the foregoing priorities are only for example. In actual applications, there may be another sorting manner, and this is not described in this application by using examples.

In an embodiment of switching between modes in this application, when the electronic device is currently in a sub-mode in the video recording mode, the electronic device may also detect whether a recommendation condition of another sub-mode is currently met. In this way, when the recommendation condition of the another sub-mode is met and a priority of the another sub-mode is higher than a priority of the current sub-mode (even if a condition for canceling recommendation of the current sub-mode is not currently met), the electronic device cancels the recommended current sub-mode and recommends the another sub-mode with the higher priority.

The following describes in detail an interface presentation process when two modes are switched.

Refer to FIG. 6. A process in which the electronic device recommends a mode includes the following stages: recommendation symbol display and disappearance processes (about 1 s), icon display & text and bottom plate expansion processes (about 300 ms), icon display & text presentation or scrolling processes (about 2 s), icon display & text and bottom plate collapse processes (about 300 ms), and an icon independent display process.

To recommend a video recording mode to the user in time, generally, duration in a recommendation condition of each video recording mode is shorter than 1 s. Therefore, at each stage in the foregoing recommendation process, it is possible to detect that a recommendation condition of another sub-mode with a higher priority is met, and the electronic device may cancel recommendation of a current sub-mode, and recommend the another sub-mode with the higher priority.

The following describes an interface change process when it is detected that the recommendation condition of the another sub-mode with the higher priority is met at each stage. A sub-mode before switching is denoted as a sub-mode A, and a sub-mode after switching is denoted as a sub-mode B.

Figure 13:
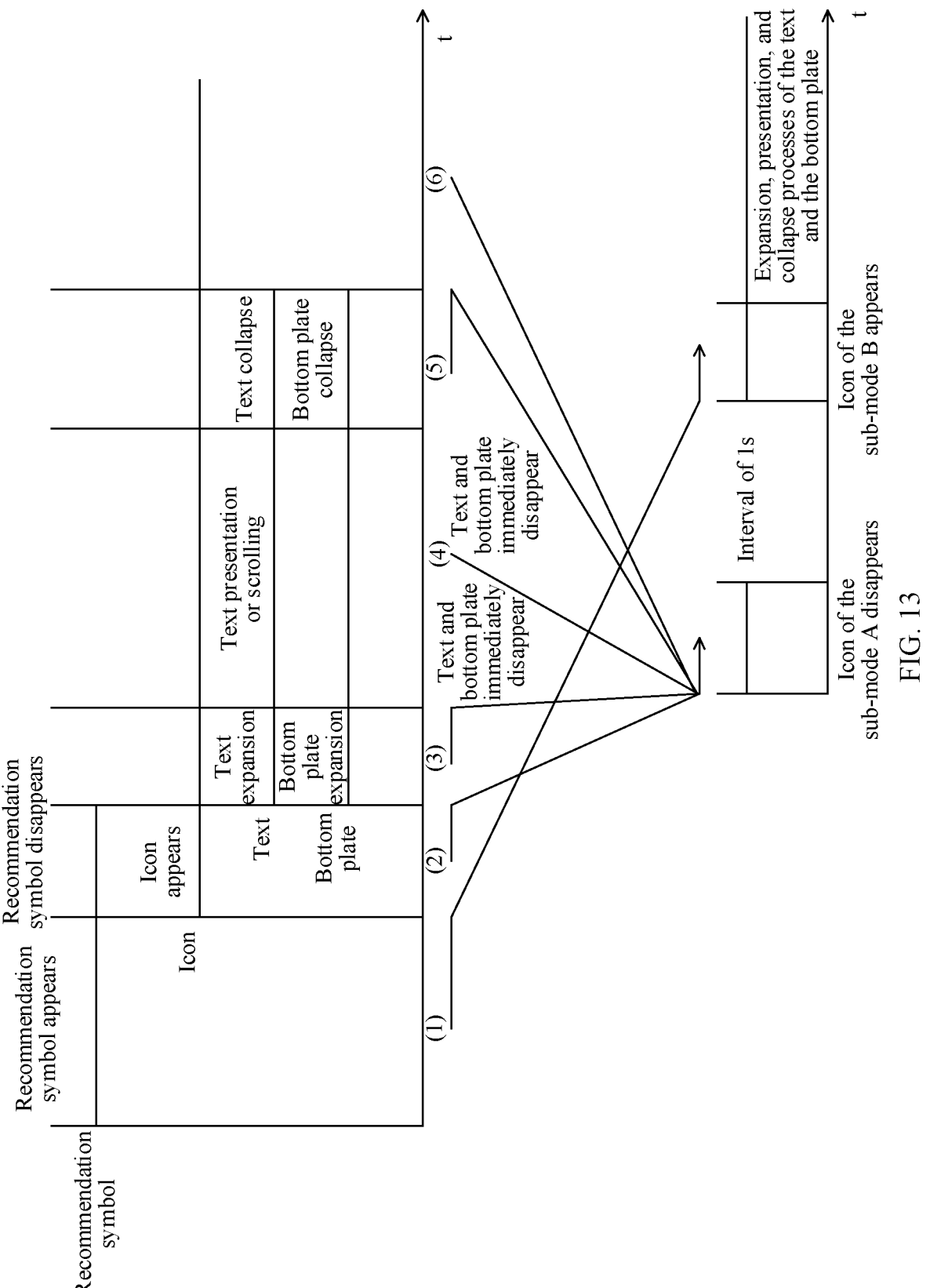
FIG. 13 is a schematic diagram of a time relationship when an electronic device switches a video recording mode at different occasions in a process of recommending a video recording mode according to an embodiment of this application.

Refer to Stage (1) in FIG. 13. In a display process of a recommendation symbol, the electronic device detects that a recommendation condition of the another sub-mode B with a higher priority is met. In this case, the electronic device recommends the another sub-mode B with the higher priority, presentation of the display process of the recommendation symbol on the preview interface of the video recording function ends, a display process of an icon of the sub-mode B (during which the recommendation symbol gradually disappears) starts to be executed, and expansion and other processes of text and a bottom plate of the sub-mode B are continuously presented next to the icon of the sub-mode B.

Refer to Stage (2) in FIG. 13. In the disappearance process of the recommendation symbol (in the display process of the icon of the sub-mode), the electronic device detects that the recommendation condition of the another sub-mode B with the higher priority is met. In this case, the electronic device recommends the another sub-mode B with the higher priority, presentation of the disappearance process of the recommendation symbol on the preview interface of the video recording function ends (an icon of the sub-mode A appears), a disappearance process of the icon of the sub-mode A is started, the display process of the icon of the sub-mode B is executed after a period of time (for example, 1 second) after the icon of the sub-mode A disappears, and the expansion and other processes of the text and the bottom plate of the sub-mode B are continuously presented next to the icon of the sub-mode B.

Refer to Stage (3) in FIG. 13. In expansion processes of text and a bottom plate of the sub-mode A, the electronic device detects that the recommendation condition of the another sub-mode B with the higher priority is met. In this case, the electronic device recommends the another sub-mode B with the higher priority, the expansion processes of the text and the bottom plate are continuously presented on the preview interface of the video recording function, the text and the bottom plate immediately disappear after the text and the bottom plate are fully expanded, the disappearance process of the icon of the sub-mode A is started, the display process of the icon of the sub-mode B is executed after a period of time (for example, 1 second) after the icon of the sub-mode A disappears, and the expansion and other processes of the text and the bottom plate of the sub-mode B are continuously presented next to the icon of the sub-mode B.

In another embodiment of this application, when the electronic device is at Stage (3), the expansion processes of the text and the bottom plate may also be canceled. In this case, the text and the bottom plate on the preview interface of the video recording function immediately disappear, the disappearance process of the icon of the sub-mode A is started, and the like.

Refer to Stage (4) in FIG. 13. In presentation processes of the text and the bottom plate of the sub-mode A (no matter what the text is scrolled), the electronic device detects that the recommendation condition of the another sub-mode B with the higher priority is met. In this case, the electronic device recommends the another sub-mode B with the higher priority, the text and the bottom plate on the preview interface of the video recording function immediately disappear, the disappearance process of the icon of the sub-mode A is started, the display process of the icon of the sub-mode B is executed after a period of time (for example, 1 second) after the icon of the sub-mode A disappears, and the expansion and other processes of the text and the bottom plate of the sub-mode B are continuously presented next to the icon of the sub-mode B.

Refer to Stage (5) in FIG. 13. In collapse processes of the text and the bottom plate of the sub-mode A, the electronic device detects that the recommendation condition of the another sub-mode B with the higher priority is met. In this case, the electronic device recommends the another sub-mode B with the higher priority, the text and the bottom plate on the preview interface of the video recording function are continuously collapsed, the disappearance process of the icon of the sub-mode A is started after the text and the bottom plate are fully collapsed, the display process of the icon of the sub-mode B is executed after a period of time (for example, 1 second) after the icon of the sub-mode A disappears, and the expansion and other processes of the text and the bottom plate of the sub-mode B are continuously presented next to the icon of the sub-mode B.

In another embodiment of this application, when the electronic device is at Stage (5), the collapse processes of the text and the bottom plate may also be canceled. In this case, the text and the bottom plate on the preview interface of the video recording function immediately disappear, the disappearance process of the icon of the sub-mode A is started, and the like.

Refer to Stage (6) in FIG. 13. In a process in which the text and the bottom plate of the sub-mode A are fully collapsed and the icon of the sub-mode A is displayed, the electronic device detects that the recommendation condition of the another sub-mode B with the higher priority is met. In this case, the electronic device recommends the another sub-mode B with the higher priority, the disappearance process of the icon of the sub-mode A is started on the preview interface of the video recording function, the display process of the icon of the sub-mode B is executed after a period of time (for example, 1 second) after the icon of the sub-mode A disappears, and the expansion and other processes of the text and the bottom plate of the sub-mode B are continuously presented next to the icon of the sub-mode B.

In addition, when a time interval between when the electronic device detects that the recommendation condition of the another sub-mode B with the higher priority is met and when the electronic device detects that the recommendation condition of the sub-mode A is met is shorter (for example, shorter than 5 seconds), Stage (6) in the foregoing example is applicable. When the time interval between when the electronic device detects that the recommendation condition of the another sub-mode B with the higher priority is met and when the electronic device detects that the recommendation condition of the sub-mode A is met is longer (for example, longer than or equal to 5 seconds), and when the electronic device recommends the another sub-mode B with the higher priority, the disappearance process of the icon of the sub-mode A is started on the preview interface of the video recording function, and after a period of time (for example, 1 second) after the icon of the sub-mode A disappears, a recommendation animation effect of the sub-mode B is executed starting from scratch, that is, starting from the display process of the recommendation symbol.

In another embodiment of this application, the another sub-mode B may also be set to be switched to only after the text is fully expanded. To be specific, at Stage (1) to Stage (3) in the foregoing examples, the electronic device does not switch to the another sub-mode B; and at Stage (4) to Stage (6) in the foregoing examples, the electronic device switches to the another sub-mode B.

In another embodiment of this application, in the process of recommending the sub-mode A, the electronic device may also be set to detect whether a condition for canceling recommendation of the sub-mode A is met, instead of detecting whether a recommendation condition of another sub-mode is met. To be specific, the electronic device does not recommend another sub-mode in a process of recommending a sub-mode; and only after it is detected that the condition for canceling recommendation of the currently recommended sub-mode is met and the recommendation of the sub-mode A is canceled, the electronic device detects whether the recommendation condition of the another sub-mode is met, to recommend the another sub-mode. For example, the electronic device switches to recommend the sub-mode B after canceling the recommendation of the sub-mode A.

Figure 14:
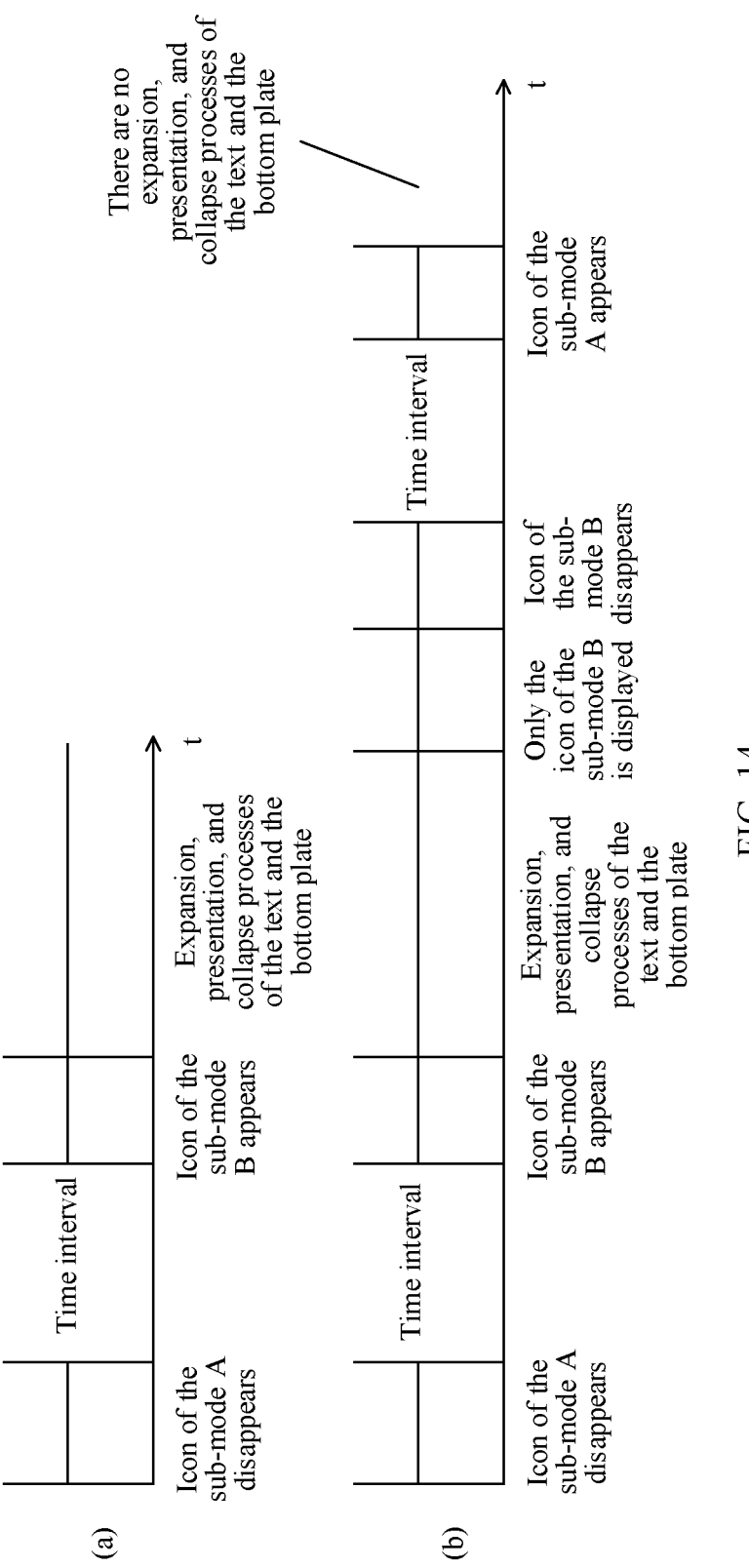
FIG. 14 is a schematic diagram of a time relationship when another video recording mode is recommended after recommendation of a video recording mode is canceled according to an embodiment of this application.

In an example, refer to (a) in FIG. 14. Events shown in the figure each occur during enabling once of the video recording function. If the electronic device cancels the recommendation of the sub-mode A and detects that the recommendation condition of the sub-mode B is met within a period of time (for example, 2 seconds, 5 seconds, 8 seconds, or 15 seconds) after the icon of the sub-mode A on the preview interface of the video recording function fully disappears, the electronic device displays the icon of the sub-mode B on the preview interface of the video recording function, and executes the expansion, presentation, and collapse processes of the text and the bottom plate shown in FIG. 13 after the icon is displayed.

During specific implementation, a time interval between when the electronic device cancels the displaying of the icon of the sub-mode A and when the electronic device displays the icon of the sub-mode B may also be set to be longer than 1 second.

In addition, to avoid frequent displaying and presentation of a recommendation symbol not related to a specific meaning of an unused mode, a recommendation symbol (presentation and disappearance processes) may be displayed only when an icon of a sub-mode is recommended for the first time after the current video recording function is enabled, and the recommendation symbol is not displayed again when another sub-mode or the same sub-mode is subsequently recommended. If the user exits the video recording function and enables the video recording function again after the photographing function is enabled, the recommendation symbol (the presentation and disappearance processes) is displayed when the icon of the sub-mode is recommended for the first time after video recording is enabled again, and the recommendation symbol is not displayed again when another sub-mode or the same sub-mode is subsequently recommended.

Certainly, as described above, after the video recording function is enabled, when the same sub-mode is recommended again during the enabling of the current video recording function, the expansion, presentation, and collapse processes of the text and the bottom plate may also not be displayed.

In an example, refer to (b) in FIG. 14. Events shown in the figure each occur during enabling once of the video recording function. After the expansion, presentation, and collapse processes of the text and the bottom plate of the sub-mode B are completed, the icon of the sub-mode B is displayed on the interface; if the electronic device detects that the condition for canceling recommendation of the sub-mode B is met, the icon of the sub-mode B on the preview interface of the video recording function disappears; and if it is detected again that the recommendation condition of the sub-mode A is met after the icon of the sub-mode B disappears for a period of time, the electronic device recommends the sub-mode A again, and the icon of the sub-mode A is displayed on the preview interface of the video recording function, but the expansion, presentation, and collapse processes of the text and the bottom plate of the sub-mode A are not displayed.

In addition, in embodiments of this application, more operations are involved and each are not separately named as different names. In actual applications, "first", "second", and the like may be added to the front of the operations for distinguishing operations at different moments or operations on different controls. Certainly, "first" and "second" in the "first operation" and the "second operation" do not indicate the sequential order of the operations.

After the recommendation processes and the switching processes of the two types of sub-modes are described, the recommendation conditions and the conditions for canceling recommendation of the sub-modes are described in detail below.

In this application, parameters in recommendation conditions corresponding to different scenes are set based on application environments of the different scenes. For example, the macro scene is applicable to close-up capturing, so that the distance between the to-be-captured object and the camera of the electronic device can be used as a parameter in a recommendation condition; the HDR scene is applicable to an overexposure condition, so that the anti-interference gain, the ambient light intensity, and the overexposure ratio can be used as parameters in a recommendation condition; the night scene is applicable to a dark capturing environment, so that the ambient light intensity can be used as a parameter in a recommendation condition; the portrait scene is applicable to face capturing, so that the proportion of the face in the preview picture acquired by the camera in the preview picture can be used as a parameter in a recommendation condition; the multi-lens scene is applicable to capturing a plurality of targets, so that whether the preview picture acquired by the camera includes the preset target can be used as a parameter in a recommendation condition; and the protagonist scene is applicable to a multi-person capturing scene, so that the quantity of faces in the preview picture acquired by the camera and the proportion of the largest face in the preview picture can be used as parameters in a recommendation condition. Certainly, in actual applications, to distinguish the foregoing non-night scene modes from the night scene mode, the ambient light intensity may also be limited in the recommendation conditions of the non-night scene modes.

For a condition for canceling recommendation corresponding to a recommendation condition of a video recording mode, it may be considered that the condition for canceling recommendation is met when the recommendation condition for the video recording mode is not met; or a more relaxed condition than a parameter range of the recommendation condition may be set, so that after the video recording mode is recommended, even if the recommendation condition is not met for short time, the recommendation of the video recording mode is not canceled. For details, refer to descriptions of subsequent embodiments.

In an example of a recommendation condition of the macro mode, the macro mode is generally applicable to a close-up capturing scenario, so that the recommendation condition of the macro mode may be that an object distance is less than a distance value d1 (for example, less than 12 cm).

It should be noted that a specific value of d1 is related to a recording algorithm in the macro mode provided by the electronic device and the camera on the electronic device. For example, if a macro mode in a video recording function of an electronic device A has a good effect in capturing an object with a distance less than 12 cm, a recommendation condition of the macro mode in the electronic device A is that the physical distance is less than 12 cm. If a macro mode in a video recording function of an electronic device B has a good effect in capturing an object with a distance less than 30 cm, a recommendation condition of the macro mode in the electronic device B is that the physical distance is less than 30 cm.

A ranging sensor may be disposed on the electronic device, and the ranging sensor is located near the camera. In an example, the ranging sensor and the camera are both on a same surface of the electronic device (for example, are both disposed on a back surface of the electronic device, which is a surface disposed away from the display screen), and a distance between the ranging sensor and the camera on the surface is less than a specific distance (for example, less than 1.5 cm).

Certainly, in actual applications, the electronic device may range in another manner. For example, the electronic device calculates a depth of field of an object closest to a depth-of-field camera based on a preview picture acquired by the depth-of-field camera, where the depth of field is a distance of the object.

A manner of ranging a distance between a to-be-captured target and the camera is not limited in embodiments of this application.

In actual applications, when the user holds the electronic device to perform video recording, a distance between the camera on the electronic device and an object may be close at a moment. In this case, the user may not really intend to carefully capture the object. Therefore, to avoid accuracy of a video recording mode recommended by the electronic device, a duration limit may further be added in the recommendation condition of the macro mode.

In another example, the recommendation condition of the macro mode is that duration for which the object distance is less than the distance value d1 is longer than time t1 (for example, 0.5 s).

In addition, if the macro mode provided by the electronic device supports recording with only a focal length of 1×, the recommendation condition of the macro mode also needs to include that a current focal length is the focal length of 1×. In other words, the recommendation condition of the macro mode may also be that the duration for which the object distance is less than the distance value d1 is longer than the time t1, and the current focal length is the focal length of 1×.

In embodiments of this application, the night scene mode is provided in the video recording function of the electronic device, and the night scene mode is applicable to a scenario in which ambient light intensity of the surroundings is extremely dark. To distinguish the macro mode from the night scene mode, the recommendation condition of the macro mode may also be that the ambient light intensity of the surroundings is added as indoor normal light based on the foregoing recommendation condition.

An ambient light sensor may be disposed on the electronic device, a specific position of the ambient light sensor on the electronic device is not limited, and the ambient light sensor may acquire ambient light intensity of the surroundings. In embodiments of this application, the recommendation condition of the macro mode may be met when the ambient light intensity acquired by the ambient light sensor is less than lux1 (a smaller value indicates brighter light). In other words, the recommendation condition of the macro mode may also be that the duration for which the object distance is less than the distance value d1 is longer than the time t1, the current focal length is the focal length of 1×, and the ambient light intensity is less than lux1. Certainly, the recommendation condition of the macro mode may also be that the duration for which the object distance is less than the distance value d1 is longer than the time t1, the current focal length is the focal length of 1×, and duration for which the ambient light intensity is less than lux1 is longer than the time t1.

It should be noted that the foregoing listed recommendation conditions of the macro mode are only for example. In actual applications, another recommendation condition different from the foregoing listed recommendation conditions may be set based on an applicable scenario of the macro mode of the electronic device. This is not described in embodiments of this application by using examples.

In an example of a condition for canceling recommendation of the macro mode, the condition for canceling recommendation of the macro mode may be that the object distance is greater than a distance value d2 (for example, greater than 17 cm). It should be noted that a specific value of d2 is also related to the recording algorithm in the macro mode provided by the electronic device and the camera on the electronic device.

In another example of the condition for canceling recommendation of the macro mode, the condition for canceling recommendation of the macro mode may be that duration for which the object distance is greater than the distance value d2 is longer than time t2 (for example, 2 s).

As described above, if the macro mode provided by the electronic device supports recording with only the focal length of 1×, when the electronic device detects a zoom operation by the user and the operation after zooming is not the focal length of 1×, the electronic device also cancels the recommendation of the macro mode. Therefore, the condition for canceling recommendation of the macro mode may also be that the duration for which the object distance is greater than the distance value d2 is longer than time t2 (for example, 2 s), or it is detected that the user changes the focal length to a focal length of non-1×.

Correspondingly, the condition for canceling recommendation of the macro mode may also be that the ambient light intensity is greater than or equal to lux1 for duration of longer than the time t2.

In an example of a recommendation condition of the HDR mode, HDR mode is generally applicable to an overexposure scenario, for example, a face is captured under backlight at sunset (a portrait condition is not met), or some landscapes (which have high contrast, and include blue sky, white clouds, green plants, shadows, and the like). Therefore, the overexposure condition may be used as the recommendation condition.

For example, the recommendation condition of the HDR mode may be set as follows: (1) An adrc gain (anti-interference gain) is greater than g1 (for example, 3.6). (2)

LV (a parameter for measuring the ambient light intensity, where a larger value indicates higher brightness) is greater than LV1 (for example, 50). (3) LV is less than or equal to LV2 (for example, 60), and an overexposure ratio is greater than 10‰; or LV is greater than LV2 and less than LV3 (for example, 75), and the overexposure ratio is greater than 12‰; or LV is greater than or equal to LV3, and the overexposure ratio is greater than 14‰.

(1) to (3) need to be met simultaneously.

In addition, to avoid misdetermining, duration for the foregoing three conditions may also be set to be longer than 1 s.

The example is only an example of the overexposure scenario. In actual applications, different recommendation conditions may also be set based on different cameras of the electronic device.

Certainly, if the HDR mode supports the focal length of 1× to a focal length of 6×, the recommendation condition of the HDR mode may also be that the focal length is any one of the focal length of 1× to the focal length of 6× based on the foregoing condition.

An example of a condition for canceling recommendation of the HDR mode is that duration for which any one of the following conditions is met is longer than 2 seconds (the adrc gain is less than 3.2; or LV is less than 60, and the overexposure ratio is less than 10‰; or LV is less than 75, and the overexposure ratio is less than 11‰; or LV is greater than 75, and the overexposure ratio is less than 13‰).

In another example of the condition for canceling recommendation of the HDR mode, the focal length is not any one of 1× to 6×.

The emphasis of embodiments of this application is not on specific content of the recommendation conditions and the conditions for canceling recommendation of the sub-modes. In actual applications, different recommendation conditions and conditions for canceling recommendation may be set based on different sub-modes.

For other sub-modes in the video recording mode in embodiments of this application, refer to the following abbreviated description of subsequent recommendation conditions and conditions for canceling recommendation.

In an example of a recommendation condition of the night scene mode, the night scene mode is generally applicable to the scenario in which ambient light intensity of the surroundings is extremely dark, for example, a park with street lights with a distance at night, or only candlelight indoors when a birthday is celebrated. Therefore, the recommendation condition of the night scene mode may be that the ambient light intensity is greater than lux2 (a larger value indicates darker light, for example, 400).

Certainly, to improve accuracy of the video recording mode recommended by the electronic device, a duration limit may further be added in the recommendation condition of the night scene. In other words, the recommendation condition of the night scene mode may also be that duration for which the ambient light intensity is greater than lux2 (a larger value indicates darker light) is longer than t3.

In addition, if the night scene mode of the electronic device supports recording with only the focal length of 1× and the focal length of 2×, the recommendation condition of the night scene mode may also be that the duration for which the ambient light intensity is greater than lux2 (a larger value indicates darker light) is longer than t3, and the current focal length is the focal length of 1× length or the focal length of 2×.

In an example of a condition for canceling recommendation of the night scene mode, the condition for canceling recommendation of the night scene mode may be that the ambient light intensity is less than lux3 (a larger value indicates darker light, for example, 370) for duration of longer than 2 s.

In another example of the condition for canceling recommendation of the night scene mode, the condition for canceling recommendation of the night scene mode may also be that the user manually zooms so that the focal length is neither the focal length of 1× nor the focal length of 2×.

In actual applications, any one of the foregoing listed conditions for canceling recommendation is met.

An example of a recommendation condition of the portrait mode is that a face is detected, at least one of a proportion of a width of a largest face detection box in the picture and a proportion of a height in the picture is greater than 15% for duration of longer than 0.33 s, and the focal length includes the focal length of 1× and the focal length of 2×. Certainly, a condition may also be added: The ambient light intensity is normal indoor light (for example, the ambient light intensity is less than lux1).

An example of a condition for canceling recommendation of the portrait mode is that the largest one of the proportion of the width of the largest detected face detection box in the picture and the proportion of the height in the picture is less than 10% for duration of longer than 2 s; or the user manually zooms, and the focal length after zooming is not the focal length of 1× or the focal length of 2×; or the ambient light intensity is greater than or equal to lux1.

An example of a recommendation condition of the protagonist mode is that a quantity of detected faces is greater than or equal to 2, both a proportion of a width of a largest face detection box in the picture and a proportion of a height in the picture are less than a first proportion (for example, 15%) and greater than a second proportion (for example, 7%) for a period of time (for example, 0.33 s); and normal indoor light is guaranteed (for example, a lux value on the Qualcomm platform is less than 350, and a LV value on the MediaTek platform is greater than 28), and the current focal length is a focal length supported by the protagonist mode.

An example of a condition for canceling recommendation of the protagonist mode is that one of the proportion of the width and the proportion of the height of the largest face detection box is less than a third proportion (for example, 5%) or greater than a fourth proportion (for example, 15%) for duration of longer than 2 s; or the zooming exceeds a supported focal length range.

An example of a recommendation condition of multi-lens video recording is that it is detected that a particular animal (for example, a cat or a dog) exists in the screen, duration for which it is detected that the particular animal exists is longer than 0.53 s (only for example), and the focal length includes the focal lengths of 1× to 6×.

An example of a condition for canceling recommendation of multi-lens video recording is that no particular animal is identified for duration of longer than 2 s; or the zoom operation by the user exceeds a range supported by the mode.

The recommendation conditions and the conditions for canceling recommendation of the plurality of sub-modes in the video recording mode are listed in the foregoing embodiments. In actual applications, other recommendation conditions and conditions for canceling recommendation may also be used.

Specific values of the parameters in embodiments of this application are only for example, and there is no limitation on this application. In actual applications, the foregoing parameters may also be other values.

It should be understood that the order of the sequence numbers of the steps in the above method embodiments does not mean the order of execution, and the execution order of each process is determined by its function and inherent logic, and does not constitute any limitation on the implementation process of embodiments of this application.

An embodiment of this application further provides a computer-readable storage medium, where the computer-readable storage medium stores a computer program, and the computer program, when executed by a processor, can implement the steps according to the foregoing method embodiments.

An embodiment of this application further provides a computer program product, where the computer program product, when run on an electronic device, enables the electronic device to implement the steps according to the foregoing method embodiments.

When the integrated unit is implemented in the form of a software functional unit and sold or used as an independent product, the integrated unit may be stored in a computer-readable storage medium. Based on such understanding, in this application, all or some of the processes of the methods in the embodiments may be implemented by a computer program instructing relevant hardware. The computer program may be stored in a computer-readable storage medium. During execution of the computer program by the processor, the steps of the foregoing method embodiments may be implemented. The computer program includes computer program code. The computer program code may be in source code form, object code form, executable file or some intermediate forms, or the like. The computer-readable medium may at least include: any entity or apparatus that can carry the computer program code to the first device, a recording medium, a computer memory, a read-only memory (ROM, Read-Only Memory), a random access memory (RAM, Random Access Memory), an electric carrier signal, a telecommunication signal and a software distribution medium, or the like, for example, a U disk, a mobile hard disk, a magnetic disk, or a CD. In some jurisdictions, according to legislation and patent practice, the computer-readable medium is not an electric carrier signal and a telecommunication signal.

An embodiment of this application further provides a chip system, where the chip system includes a processor, the processor is coupled to a memory, and the processor is configured to run a computer program stored in the memory, to implement the steps according to any one of the method embodiments of this application. The chip system may be a single chip, or a chip module formed by a plurality of chips.

In the embodiments, descriptions of the embodiments have different emphases. As for parts that are not described in detail in one embodiment, reference can be made to the relevant descriptions of the other embodiments.

A person of ordinary skill in the art may notice that examples of the units and method steps described with reference to the embodiments disclosed in this specification can be implemented in electronic hardware, or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the spirit and scope of the technical solutions in the embodiments of this application, and should fall within the protection scope of this application.

The invention claimed is:

1. A method, comprising:
displaying a first preview interface of a video recording function, wherein the first preview interface comprises an artificial intelligence (AI) control and a preview picture captured by a camera, and the AI control is in an enabled state;
displaying an icon of a first video recording mode corresponding to a first scene on the first preview interface when a video recording scene is the first scene at a first moment;
canceling the display of the icon of the first video recording mode on the first preview interface when the video recording scene is not the first scene at a second moment, wherein the second moment is later than the first moment;
displaying an icon of a second video recording mode corresponding to a second scene on the first preview interface when the video recording scene is the second scene and a focal length of the camera is a first focal length at a third moment, wherein the second video recording mode supports recording with the first focal length;
receiving a first operation on the icon of the second video recording mode; and
displaying a second preview interface of the second video recording mode in response to the first operation.

2. The method of claim 1, wherein the first video recording mode is a first-type sub-mode, and wherein displaying the icon of the first video recording mode corresponding to the first scene on the first preview interface further comprises either:
a) receiving a second operation when the icon of the first video recording mode indicates an enabled state, wherein the second operation acts on the icon of the first video recording mode indicating the enabled state; and
switching, in response to the second operation, the icon of the first video recording mode indicating the enabled state to an icon indicating a disabled state on the first preview interface; or
b) receiving a third operation when the icon of the first video recording mode indicates a disabled state, wherein the third operation acts on the icon of the first video recording mode indicating the disabled state; and
switching, in response to the third operation, the icon of the first video recording mode indicating the disabled state to an icon indicating an enabled state on the first preview interface.

3. The method of claim 2, wherein an initial state of an icon of the first-type sub-mode is an enabled state when the icon of the first-type sub-mode is displayed on the first preview interface.

4. The method of claim 1, wherein the second video recording mode is a second-type sub-mode, and wherein displaying the second preview interface of the second video recording mode in response to the first operation comprises:

displaying the second preview interface of the second video recording mode in response to the first operation acting on the icon of the second video recording mode indicating a disabled state, wherein the second preview interface comprises a first control indicating to disable the second video recording mode or cancel recommendation of the second video recording mode;

receiving a fourth operation when the second preview interface of the second video recording mode is displayed, wherein the fourth operation acts on the first control; and displaying the first preview interface of the video recording function in response to the fourth operation.

5. The method of claim 4, wherein when the first control indicates to disable the second video recording mode, the icon of the second video recording mode on the first preview interface displayed in response to the fourth operation indicates the disabled state, and wherein when the first control indicates to cancel the recommendation of the second video recording mode, the first preview interface displayed in response to the fourth operation does not comprise the icon of the second video recording mode.

6. The method of claim 4, wherein an initial state of an icon of the second-type sub-mode is the disabled state when the icon of the second-type sub-mode is displayed on the first preview interface.

7. The method of claim 1, wherein the second video recording mode does not support recording with a second focal length, and wherein of displaying the icon of the second video recording mode corresponding to the second scene on the first preview interface further comprises:

receiving a fifth operation for switching the focal length of the camera from the first focal length to the second focal length; and canceling, in response to the fifth operation, the display of the icon of the second video recording mode on the first preview interface, and switching the focal length of the camera from the first focal length to the second focal length.

8. The method of claim 1, wherein the second video recording mode supports recording with a third focal length, and wherein displaying the icon of the second video recording mode corresponding to the second scene on the first preview interface further comprises:

receiving a sixth operation for switching the focal length of the camera from the first focal length to the third focal length; and continuously displaying, in response to the sixth operation, the icon of the second video recording mode on the first preview interface, and switching the focal length of the camera from the first focal length to the third focal length.

9. The method of claim 8, wherein after switching the focal length of the camera from the first focal length to the third focal length on the first preview interface, the method further comprises:

receiving a seventh operation when the icon of the second video recording mode displayed on the first preview interface is in the enabled state, wherein the seventh operation acts on a second control on the first preview interface, and the second control is for starting video recording; and starting, in response to the seventh operation, video recording based on the third focal length and the second video recording mode.

10. The method of claim 1, wherein before canceling the display of the icon of the first video recording mode on the first preview interface, the icon of the first video recording mode is in a first state, wherein the first state is not an initial state of the icon of the first video recording mode, and wherein after displaying the icon of the second video recording mode corresponding to the second scene on the first preview interface, the method further comprises:

canceling the display of the icon of the second video recording mode on the first preview interface when the video recording scene is not the second scene at a fourth moment, wherein the fourth moment is later than the third moment;

displaying the icon of the first video recording mode corresponding to the first scene on the first preview interface when the video recording scene is the first scene at a fifth moment and a time interval between the fifth moment and the second moment is shorter than a first duration, wherein a current state of the icon of the first video recording mode is the first state, and the fifth moment is later than the fourth moment; and displaying the icon of the first video recording mode corresponding to the first scene on the first preview interface when the video recording scene is the first scene at the fifth moment and the time interval between the fifth moment and the second moment is longer than or equal to the first duration, wherein the current state of the icon of the first video recording mode is the initial state of the icon of the first video recording mode.

11. The method of claim 1, further comprising:

receiving an eighth operation while displaying the icon of the second video recording mode corresponding to the second scene on the first preview interface, wherein the eighth operation acts on the AI control in the enabled state; and canceling, in response to the eighth operation, the display of the icon of the second video recording mode corresponding to the second scene on the first preview interface.

12. The method of claim 1, wherein before displaying the icon of the first video recording mode corresponding to the first scene on the first preview interface, the method further comprises displaying a recommendation symbol on the first preview interface in a gradual display process.

13. The method of claim 12, wherein the icon of the first video recording mode corresponding to the first scene on the first preview interface is displayed in a gradual display process, and wherein before displaying the icon of the first video recording mode corresponding to the first scene on the first preview interface, or in the gradual display process of the icon, the method further comprises canceling the display of the recommendation symbol on the first preview interface, wherein a disappearance process of the recommendation symbol is a gradual disappearance process.

14. The method of claim 12, wherein after displaying the icon of the first video recording mode corresponding to the first scene on the first preview interface for a second duration, the method further comprises:

displaying first text information on the first preview interface, wherein the display process of the first text information comprises a text gradual expansion process, and the first text information indicates a meaning of the icon of the first video recording mode; and canceling the display of the first text information after the first text information is displayed for a third duration, wherein a disappearance process of the first text information comprises a text gradual collapse process, a first bottom plate exists below the first text information, and the first bottom plate is expanded with the first text information and collapsed with the first text information.

15. The method of claim 14, wherein the recommendation symbol is not displayed before displaying the icon of the second video recording mode corresponding to the second scene on the first preview interface.

16. The method of claim 14, wherein after displaying the icon of the second video recording mode corresponding to the second scene on the first preview interface, the method further comprises:

canceling the display of the icon of the second video recording mode on the first preview interface when the video recording scene is not the second scene at a sixth moment, wherein the sixth moment is later than the third moment; and displaying the icon of the first video recording mode corresponding to the first scene on the first preview interface when the video recording scene is the first scene at a seventh moment, wherein the first text information of the first video recording mode is not displayed when the icon of the first video recording mode is not displayed for a first time after a current video recording function is enabled, and the seventh moment is later than the sixth moment.

17. The method of claim 1, wherein an initial state of the icon of the first video recording mode is a disabled state, and wherein if displaying the icon of the first video recording mode for a first time is recommended, after displaying the icon of the first video recording mode corresponding to the first scene on the first preview interface for fourth duration, the method further comprises displaying prompt information to prompt a user to tap on the icon of the first video recording mode to enable the first video recording mode.

18. The method of claim 1, further comprising displaying the icon of the first video recording mode corresponding to the first scene on the first preview interface when a recommendation condition of the first video recording mode is currently met, wherein when the first scene is a macro scene, the recommendation condition of the first video recording mode is related to a distance of a to-be-captured object and an ambient light intensity, wherein when the first scene is a high dynamic range (HDR) scene, the recommendation condition of the first video recording mode is related to an anti-interference gain, the ambient light intensity, and an overexposure ratio, wherein when the first scene is a night scene, the recommendation condition of the first video recording mode is related to the ambient light intensity, wherein when the first scene is a portrait scene, the recommendation condition of the first video recording mode is related to a proportion of a face in the preview picture acquired by the camera in the preview picture, wherein when the first scene is a multi-lens video recording scene, the recommendation condition of the first video recording mode is related to whether the preview picture acquired by the camera comprises a preset target, and wherein when the first scene is a protagonist scene, the recommendation condition of the first video recording mode is related to a quantity of faces in the preview picture acquired by the camera and a proportion of a largest face in the preview picture.

19. An electronic device, comprising:
one or more processors;
a camera coupled to the one or more processors; and
a memory coupled to the one or more processors and configured to store instructions that, when executed by the one or more processors, cause the electronic device to be configured to:

display a first preview interface of a video recording function, wherein the first preview interface comprises an artificial intelligence (AI) control and a preview picture captured by the camera, and the AI control is in an enabled state;

display an icon of a first video recording mode corresponding to a first scene on the first preview interface when a video recording scene is the first scene at a first moment;

cancel the display of the icon of the first video recording mode on the first preview interface when the video recording scene is not the first scene at a second moment, wherein the second moment is later than the first moment;

display an icon of a second video recording mode corresponding to a second scene on the first preview interface when the video recording scene is the second scene and a focal length of the camera is a first focal length at a third moment, wherein the second video recording mode supports recording with the first focal length;

receive a first operation on the icon of the second video recording mode; and display a second preview interface of the second video recording mode in response to the first operation.

20. A non-transitory computer-readable storage medium storing instructions that, when executed by one or more processors of an electronic device, cause the electronic device to be configured to:

display a first preview interface of a video recording function, wherein the first preview interface comprises an artificial intelligence (AI) control and a preview picture captured by a camera, and the AI control is in an enabled state;

display an icon of a first video recording mode corresponding to a first scene on the first preview interface when a video recording scene is the first scene at a first moment;

cancel the display of the icon of the first video recording mode on the first preview interface when the video recording scene is not the first scene at a second moment, wherein the second moment is later than the first moment;

display an icon of a second video recording mode corresponding to a second scene on the first preview interface when the video recording scene is the second scene and a focal length of the camera is a first focal length at a third moment, wherein the second video recording mode supports recording with the first focal length;

receive a first operation on the icon of the second video recording mode; and display a second preview interface of the second video recording mode in response to the first operation.

* * * * *